(12) United States Patent
Brion et al.

(10) Patent No.: US 10,743,565 B2
(45) Date of Patent: Aug. 18, 2020

(54) FEED PELLETS AND RELATED SYSTEMS AND METHODS

(71) Applicant: CAN Technologies, Inc., Hopkins, MN (US)

(72) Inventors: Todd G. Brion, Monticello, MN (US); James Nathan Pike, Amarillo, TX (US)

(73) Assignee: CAN TECHNOLOGIES, INC., Wayzata, MN (US)

( * ) Notice: Subject to any disclaimer, the term of this patent is extended or adjusted under 35 U.S.C. 154(b) by 252 days.

(21) Appl. No.: 15/027,094

(22) PCT Filed: Oct. 1, 2014

(86) PCT No.: PCT/US2014/058574
§ 371 (c)(1),
(2) Date: Apr. 4, 2016

(87) PCT Pub. No.: WO2015/050955
PCT Pub. Date: Apr. 9, 2015

(65) Prior Publication Data
US 2016/0235093 A1    Aug. 18, 2016

Related U.S. Application Data

(60) Provisional application No. 61/885,625, filed on Oct. 2, 2013, provisional application No. 61/924,951, filed on Jan. 8, 2014.

(51) Int. Cl.
*A23K 40/10*    (2016.01)
*A23K 50/30*    (2016.01)
(Continued)

(52) U.S. Cl.
CPC .............. *A23K 40/10* (2016.05); *A23K 10/30* (2016.05); *A23K 10/33* (2016.05); *A23K 20/174* (2016.05);
(Continued)

(58) Field of Classification Search
CPC ...... A23K 20/24; A23K 20/22; A23K 20/174; A23K 10/33; A23K 10/30; A23K 40/10; A23K 50/00; A23N 17/007; A23N 17/005
See application file for complete search history.

(56) References Cited

U.S. PATENT DOCUMENTS 2,799,583 A    7/1957    Harris et al.
2,813,299 A    11/1957   Massey et al.
(Continued)

FOREIGN PATENT DOCUMENTS

CN    1069171       2/1993
EP    0040654 A2    12/1981
(Continued)

OTHER PUBLICATIONS https://www.dictionary.com/browse/apparatus. retrieved online Oct. 9, 2018 (Year: 2018).*
(Continued)

*Primary Examiner* — Hong T Yoo

(57) ABSTRACT

The present disclosure relates to methods of making a feed pellet for an animal by agglomerating at least two ingredients in a first apparatus to form a plurality of nuclei and tumbling the plurality of nuclei in a second apparatus and simultaneously providing additional amounts of the at least two ingredients to the second apparatus, thereby forming a plurality of feed pellets for an animal. The present disclosure also relates to associated feed pellets and systems.

23 Claims, 9 Drawing Sheets

(51) Int. Cl.
A23K 50/60 (2016.01)
A23K 50/75 (2016.01)
A23K 50/80 (2016.01)
A23K 40/00 (2016.01)
A23K 20/174 (2016.01)
A23K 20/22 (2016.01)
A23K 20/24 (2016.01)
A23K 10/30 (2016.01)
A23K 10/33 (2016.01)
A23N 17/00 (2006.01)

(52) U.S. Cl.
CPC .............. *A23K 20/22* (2016.05); *A23K 20/24* (2016.05); *A23K 40/00* (2016.05); *A23K 50/30* (2016.05); *A23K 50/60* (2016.05); *A23K 50/75* (2016.05); *A23K 50/80* (2016.05); *A23N 17/005* (2013.01); *A23N 17/007* (2013.01); *Y02A 40/818* (2018.01)

(56) References Cited

U.S. PATENT DOCUMENTS

| | | | |
|---|---|---|---|
| 2,847,710 | A | 8/1958 | Pitzer et al. |
| 2,851,356 | A * | 9/1958 | Bedford .................... A23J 1/04 426/321 |
| 3,105,790 | A | 10/1963 | Bartholomew et al. |
| 3,249,441 | A | 5/1966 | Craig et al. |
| 3,315,589 | A | 4/1967 | Hirahara |
| 3,416,928 | A | 12/1968 | Freese et al. |
| 3,464,824 | A | 9/1969 | Jensen et al. |
| 3,467,525 | A * | 9/1969 | Flier ...................... A23K 40/20 426/285 |
| 3,573,924 | A | 4/1971 | Zarow et al. |
| 3,906,140 | A | 9/1975 | Capes |
| 4,153,735 | A | 5/1979 | Mommer et al. |
| 4,323,584 | A | 4/1982 | Saldien |
| 4,415,547 | A | 11/1983 | Yu et al. |
| 4,542,031 | A | 9/1985 | Nakajima et al. |
| 4,642,238 | A | 2/1987 | Lin et al. |
| 4,713,245 | A | 12/1987 | Watanabe et al. |
| 4,775,539 | A | 10/1988 | Van et al. |
| 4,842,863 | A | 6/1989 | Nishimura et al. |
| 4,929,163 | A | 5/1990 | Volk |
| 4,988,520 | A | 1/1991 | Overton et al. |
| 5,019,148 | A | 5/1991 | Moore |
| 5,285,681 | A | 2/1994 | Binder et al. |
| 5,391,371 | A | 2/1995 | Jensen et al. |
| 5,419,498 | A | 5/1995 | Rasmussen et al. |
| 5,556,634 | A | 9/1996 | Moore |
| 5,567,452 | A | 10/1996 | Rebhan et al. |
| 5,629,038 | A | 5/1997 | Kalmbach et al. |
| 5,635,198 | A | 6/1997 | Nishimura et al. |
| 5,650,184 | A | 7/1997 | Lubbe et al. |
| 5,686,111 | A | 11/1997 | Jalbert et al. |
| 5,686,125 | A | 11/1997 | Mueller et al. |
| 5,786,007 | A | 7/1998 | Webb et al. |
| 5,786,008 | A | 7/1998 | Bevans et al. |
| 5,871,773 | A | 2/1999 | Julien et al. |
| 5,871,802 | A | 2/1999 | Crenshaw et al. |
| 5,935,635 | A | 8/1999 | Mori et al. |
| 6,024,993 | A | 2/2000 | Theuninck et al. |
| 6,120,815 | A | 9/2000 | Moore et al. |
| 6,221,424 | B1 | 4/2001 | Kalmbach |
| 6,238,709 | B1 | 5/2001 | Kalmbach |
| 6,238,727 | B1 | 5/2001 | Kato et al. |
| 6,293,994 | B1 | 9/2001 | Field et al. |
| 6,306,427 | B1 | 10/2001 | Laffay et al. |
| 6,365,208 | B1 | 4/2002 | Rogers et al. |
| 6,436,453 | B1 | 8/2002 | Van et al. |
| 6,500,426 | B1 | 12/2002 | Harz et al. |
| 6,584,700 | B1 | 7/2003 | Hawkins |
| 7,186,533 | B2 | 3/2007 | Klein et al. |
| 7,611,701 | B2 | 11/2009 | Harz et al. |
| 2003/0129295 | A1 | 7/2003 | Richardson et al. |
| 2003/0148013 | A1 | 8/2003 | Jobe et al. |
| 2003/0170371 | A1 | 9/2003 | Jobe et al. |
| 2004/0033985 | A1 | 2/2004 | Chi et al. |
| 2004/0052905 | A1 | 3/2004 | Pelletier et al. |
| 2005/0163911 | A1 | 7/2005 | McGowen et al. |
| 2006/0045957 | A1 | 3/2006 | Bevans et al. |
| 2006/0127531 | A1 | 6/2006 | Jobe et al. |
| 2006/0170128 | A1 | 8/2006 | Belanger et al. |
| 2006/0198928 | A1 | 9/2006 | Jobe et al. |
| 2008/0008779 | A1 | 1/2008 | Zuccarello et al. |
| 2008/0031998 | A1 | 2/2008 | Marcussen et al. |
| 2008/0131358 | A1 | 6/2008 | Woida et al. |
| 2009/0317515 | A1 | 12/2009 | Lohscheidt et al. |
| 2010/0022634 | A1 | 1/2010 | Holmes et al. |
| 2010/0055253 | A1 | 3/2010 | Gautier et al. |
| 2010/0092618 | A1 | 4/2010 | Jobe et al. |
| 2010/0226995 | A1 | 9/2010 | Debrouse et al. |
| 2010/0239537 | A1 | 9/2010 | Zhou et al. |
| 2010/0326151 | A1 | 12/2010 | Madigan et al. |
| 2012/0082721 | A1 | 4/2012 | Buessing et al. |
| 2013/0064963 | A1 | 3/2013 | Leisure et al. |
| 2013/0089640 | A1 | 4/2013 | Lehscheidt et al. |
| 2013/0136827 | A1 | 5/2013 | Drouillard et al. |
| 2013/0305793 | A1 | 11/2013 | Moore et al. |

FOREIGN PATENT DOCUMENTS

| | | |
|---|---|---|
| EP | 0125894 A2 | 11/1984 |
| EP | 749698 A2 | 12/1996 |
| EP | 2143339 A1 | 1/2010 |
| GB | 1316377 A | 5/1973 |
| GB | 2123671 A | 2/1984 |
| RU | 2354403 C2 | 5/2009 |
| WO | 9809538 | 3/1998 |
| WO | 0101790 A1 | 1/2001 |
| WO | 2006034098 A1 | 3/2006 |
| WO | 2007054465 A1 | 5/2007 |
| WO | 2011041083 A1 | 4/2011 |
| WO | 2011091111 A1 | 7/2011 |
| WO | 2012134942 A1 | 10/2012 |
| WO | 2015050955 A1 | 4/2015 |

OTHER PUBLICATIONS

International Search Report dated Dec. 30, 2014 for International Application No. PCT/US2014/058574 (3 pages).
Wolfgang Pietech "An introduction to growth-tumble arid pressure agglomeration", Powder and Bulk Engineering, Feb. 2006, vol. 20, No. 2, pp. 27-32.
Sara Gantner, "Capturing lost profits with agglomeration", Powder and Bulk Engineering, Feb. 2007, vol. 21, No. 2 pp. 23-28.
Brian H. Pittenger et al., "How to minimize feed segregation to an agolornerator—Part I", Powder and Bulk Engineering, Feb. 2008, vol. 22, No. 2, pp. 21-26.
Mike McDonald et al., "Recent developments in soluble silicate-based binders", Powder and Bulk Engineering, Feb. 2009, pp. 30-35.
Aliev, A.A. et al. (SU 670293; Translation of Abstract). 1977.
Downloaded from https://en.wikipedia.org/wiki/Molasses on Aug. 13, 2009.
"Feeds and Feeding", Cullison, A.E., Feeds and Feeding, No. Ed. 3, 1982, pp. 75-76; ISBN: 0835919056; Reston Publishing Co., Inc.
"Granulor", Vitamex, 2003.
"*Hansgirg v. Kemmer*", Court of Customs and Patent Appeals, Appl. No. 4077, 40 USPQ 665, Feb. 27, 1939, 1-4.
"*Verdegaal Brothers Inc. v. Union Oil Company of California*", U.S. Court of Appeals Federal Circuit, 2 USPQ2d 1051, No. 86/1258, 814 F2d 628, Mar. 12, 1987, 1-5.
Albert, Kurt B., et al., "Pelletizing Limestone Fines—A Study of the Benefits of Pelletized Limestone Fines in the Commercial and Agricultural Market", Albert, Kurt B., and Don Langford. "Pelletizing Limestone Fines." Mars Mineral, Pennsylvania (1998): 12-29.
Awad, Wageha, et al., "Decontamination and detoxification strategies for the Fusarium mycotoxin deoxynivalenol in animal feed

(56) References Cited

OTHER PUBLICATIONS and the effectiveness of microbial biodegradation", Food Additives and Contaminants, Mar. 2010, vol. 27, Iss 4, pp. 1-28, p. 9, In 260-263, In 279-280.

Danicke, Sven, et al., "Investigations on the kinetics of the concentration of deoxynivalenol (DON) and on spoilage by moulds and yeasts of wheat grain preserved with sodium metabisulfite (Na2S2O5, SBS) and propionic acid at various moisture contents", Archrives of Animal Nutrition, Jun. 2010, 64(3): 199-203, abstract PMID:20578648., 199-203.

Mommer, Jr., et al., "A Guide to Feed Pelletizing Technology", Uniscope, Inc., 2002, 1-22.

Stewart, Robert L., et al., "Mineral Supplements for Beef Production", The University of Georgia College of Agriculture & Environmental Sciences Cooperative Extension Service, 1994, 1-9.

Veverka, Jim, et al., "A Comparison of Liquid Binders for Limestone Pelletizing", Veverka, Jim, and Robert Hinkle. "A comparison of liquid binders for limestone pelletizing." Biennial Conference-Institute of Briquetting and Agglomeration. vol. 27. Institute for Briquetting and Agglomeration, 2001.

* cited by examiner

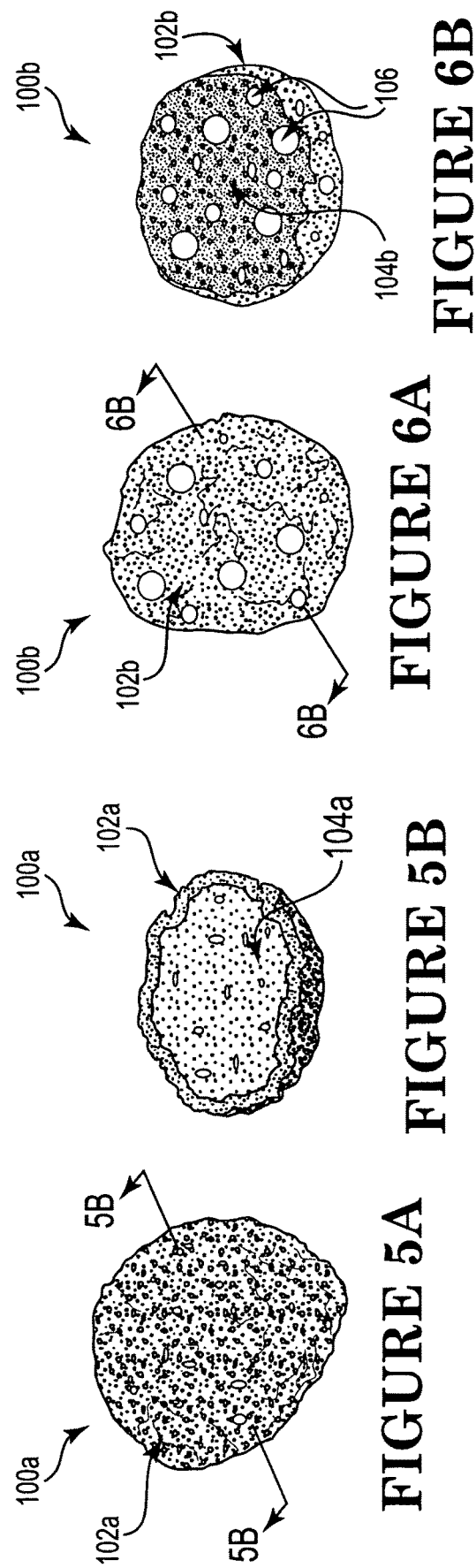

FEED PELLETS AND RELATED SYSTEMS AND METHODS

CROSS-REFERENCE TO RELATED APPLICATIONS

This application is a national phase application of PCT/US2014/058574, filed Oct. 1, 2014, entitled FEED PELLETS AND RELATED SYSTEMS AND METHODS, which claims the benefit of priority to U.S. Provisional Application No. 61/885,625, filed Oct. 2, 2013, entitled COMPOUND FEED PELLET SYSTEM and to U.S. Provisional Application No. 61/924,951, filed Jan. 8, 2014, entitled MINERAL FEED PELLET, the entirety of which are incorporated herein by reference.

TECHNICAL FIELD

The present disclosure relates generally to pellets. More particularly, the present disclosure relates to methods of making a feed pellet for an animal by agglomerating at least two ingredients in a first apparatus to form a plurality of nuclei and tumbling the plurality of nuclei in a second apparatus and simultaneously providing additional amounts of the at least two ingredients to the second apparatus, thereby forming a plurality of feed pellets for an animal. The present disclosure also relates to associated feed pellets made by such methods and systems for making such pellets.

BACKGROUND

It is known to use pressure to create an animal feed pellet consisting of two or more feed ingredients and a binder. Such known pellets are typically made using a pellet press (also commonly referred to as a pellet mill or flat-die pellet mill). The pellet press typically includes a cylindrical housing enclosing several rollers configured to roll over a flat round perforated die (i.e. a ring die press). To make the pellets, the ingredients and the binder are pressed by the rollers in the housing (at a high temperature of about 48° C. to about 95° C.). When the ingredients and the binder make contact with the rollers, they are forced or extruded through the circular holes of the die, and then cut with a knife, resulting in the formation of pellets having a cylindrical shape.

One known animal feed pellet made in a pellet mill incorporates a high melting point (i.e. 65° C.) fat (i.e. fully hydrogenated soybean oil) and is described in U.S. patent application Ser. No. 11/230,309 entitled "Mineral Feed Supplement" filed Sep. 19, 2005 by Jobe et al. and currently assigned to CAN Technologies, Inc. Another known animal feed pellet made in a pellet mill incorporates a high melting point fat binder (i.e. soy oil 0.50 wt %) and also includes the following ingredients: wheat mids (18.00 wt %), urea (5.00 wt %), calcium carbonate (56.40 wt %), salt (18.10 wt %), and other trace vitamins and minerals (2.00 wt %). However, preparation of such known animal feed pellet requires high pressures and high melting-point binders/lubricants.

It is also known to use a tumble growth agglomeration method to make a fertilizer pellet consisting of an ingredient and a binder. However, the ingredients and binders in such known fertilizer pellets are not suitable for animal feed.

SUMMARY

In one aspect, provided is a method of making a feed pellet for an animal, the method including: providing at least two ingredients to a first apparatus; agglomerating at least two ingredients in the first apparatus to form a plurality of nuclei; transferring the plurality of nuclei to a second apparatus that is separate from the first apparatus; tumbling the plurality of nuclei in the second apparatus and simultaneously providing additional amounts of the at least two ingredients to the second apparatus, thereby forming a plurality of feed pellets for an animal.

In another aspect, provided is a feed pellet for providing nutrition to an animal, the pellet including: a nucleus including at least two ingredients; and an exterior layer comprising the at least two of the ingredients, wherein the exterior layer substantially surrounds the nucleus.

In another aspect, provided is a mineral feed pellet including: a calcium nutrient provided by at least one calcium containing ingredient, wherein the calcium containing ingredient is present in an amount in the range from 50 to 80 percent by weight of the feed pellet; and an added salt nutrient provided by at least one chloride salt containing ingredient, wherein the chloride salt containing ingredient is present in an amount in the range from 15 to 20 percent by weight of the feed pellet.

In another aspect, provided is a mineral feed pellet including: a calcium nutrient provided by at least one calcium containing ingredient, wherein the calcium containing ingredient is present in an amount in the range from 40 to 80 percent by weight of the feed pellet; an added salt nutrient provided by at least one chloride salt containing ingredient, wherein the chloride salt containing ingredient is present in an amount in the range from 5 to 20 percent by weight of the feed pellet; and a non-protein nitrogen nutrient provided by a nitrogen containing ingredient, wherein the nitrogen containing ingredient is present in an amount in the range from 1 to 40 percent by weight of the feed pellet.

In another aspect, provided is a system for making a feed pellet for an animal, the system including: a source of a first ingredient; a source of a second ingredient; a first apparatus in fluid communication with the source of the first ingredient and the source of the second ingredient to provide the first ingredient and the second ingredient to the first apparatus to agglomerate the first ingredient and the second ingredient to form a plurality of nuclei; a second apparatus in fluid communication with the first apparatus to transfer the plurality of nuclei to the second apparatus to tumble the plurality of nuclei in the second apparatus, wherein the second apparatus is in fluid communication with the source of the first ingredient and the source of the second ingredient to simultaneously provide additional amounts of the first and second ingredients to the second apparatus while tumbling the plurality of nuclei to form a plurality of feed pellets for an animal, wherein the second apparatus is separate from the first apparatus.

BRIEF DESCRIPTION OF THE DRAWINGS

FIG. 5A is a perspective view of a feed pellet made by growth tumble agglomeration in accordance with an embodiment of the disclosure.

FIG. 5B is a cross-sectional view of the feed pellet of FIG. 5A along line 5B-5B of FIG. 5A.

FIG. 6A is a perspective view of a feed pellet made by growth tumble agglomeration in accordance with an embodiment of the disclosure.

FIG. 6B is a cross-sectional view of the feed pellet of FIG. 6A along line 6B-6B of FIG. 6A.

DETAILED DESCRIPTION

Overview

Specific details of several embodiments of the disclosure are described below with reference to a mineral feed or compound feed pellet system and method.

Processing and Equipment

Figure 1:
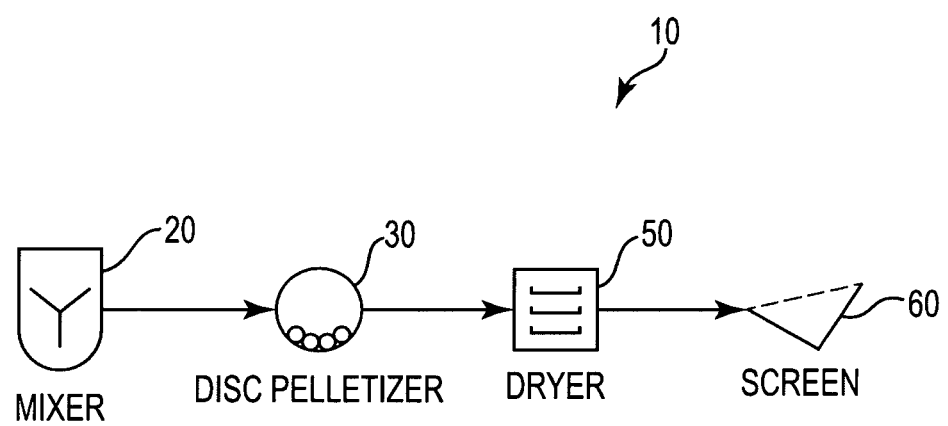
FIG. 1 is a process flow diagram of a system for making a feed pellet in accordance with an embodiment of the disclosure.

FIG. 1 is a process flow diagram of a system 10 for making feed pellets 100a, 100b, 100c (see FIG. 7) in accordance with an embodiment of the disclosure. As shown in FIG. 1, system 10 includes a mixing apparatus (shown as a paddle or pin mixer 20), a tumble growth agglomeration apparatus (shown as a disc or drum pelletizer 30), a conditioning apparatus (e.g. heater, cooler, etc. and shown as a dryer 50), and a sorting apparatus (such as a sieve and shown as a screen 60). To make feed pellet 100a (see FIG. 7), a dry mix of ingredients is fed into pin mixer 20. A binder is also fed into pin mixer 20. The binder provides some moisture to the dry mix. As mixing occurs, the ingredients of the dry mix adhere to one another via the binder to form aggregates (e.g. clumps, seeds, pellets, etc. and shown in FIG. 8A as a nucleus 110a). Nucleus 110a is then conveyed to disc pelletizer 30. Additional amounts of feed (dry mix and/or seed pellets), and binder are added to nucleus 110a in disc pelletizer 30. As disc pelletizer 30 rotates or spins (i.e. tumbles) nucleus 110a, the dry mix and the binder further adhere to nucleus 110a building a coating or exterior layer substantially surrounding nucleus 110a (see FIG. 8A) to form feed pellet 100a. Feed pellet 100a is then conveyed to dryer 50 where moisture is removed from feed pellet 100a. Feed pellet 100a is then conveyed to screen 60. Screen 60 sorts feed pellets according to their various sizes (i.e. diameter). For example, feed pellets having a larger diameter are retained on the mesh of certain screens, and feed pellets having a smaller diameter pass through the mesh of certain screens.

Figure 2:
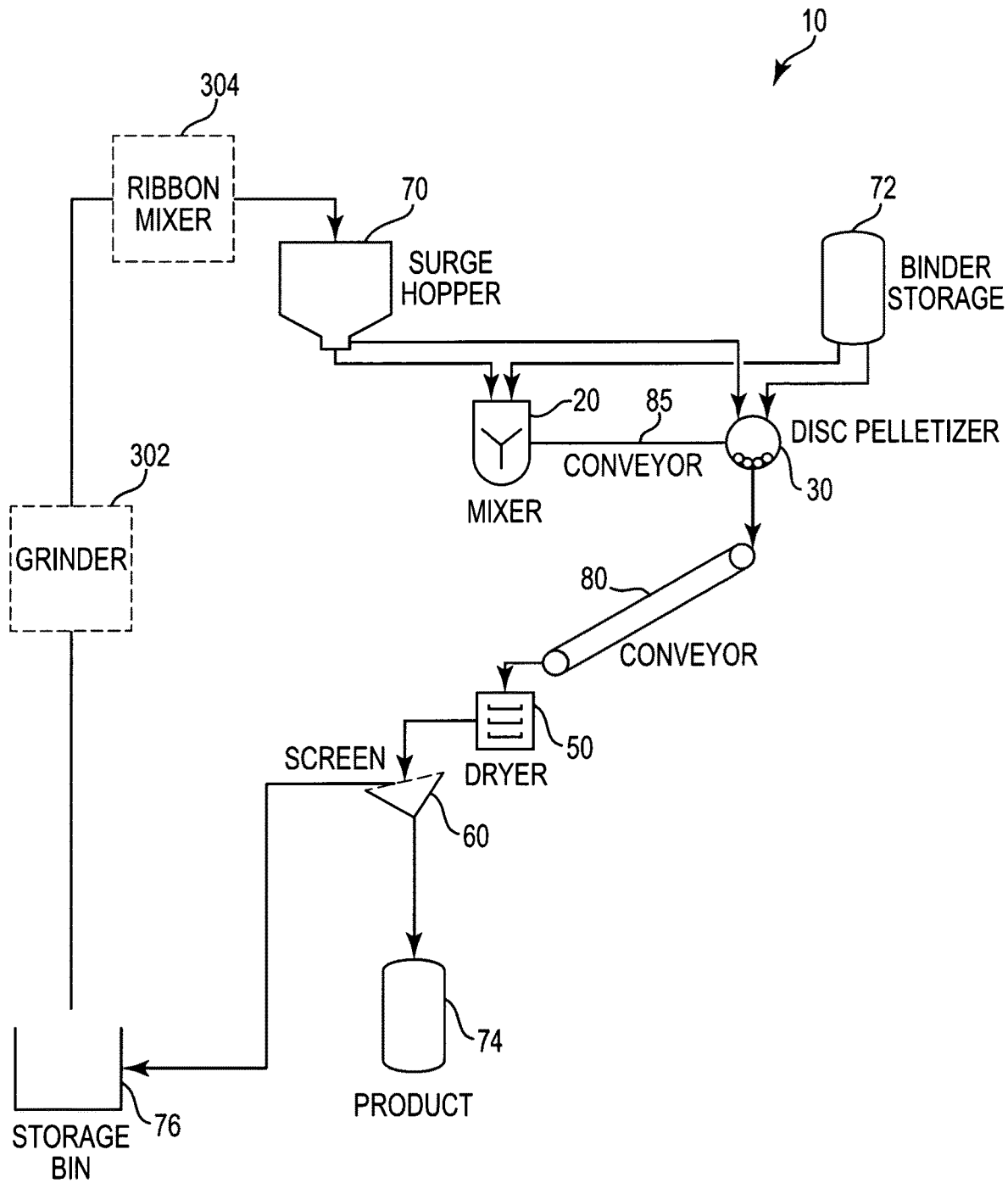
FIG. 2 is a process flow diagram of a system for making a feed pellet according to an alternative embodiment of the disclosure.

FIG. 2 is process flow diagram of system 10 for making feed pellets 100a, 110b, and 110c according to an alternative embodiment of the disclosure. As shown in FIG. 2, system 10 includes a material storage system (shown as a storage or surge hopper 70, a binder storage tank 72, a product storage bin 74, a storage bin 76 (which may be used, for example, to collect off-specification material), pin mixer 20, disc pelletizer 30, a transfer system (such as a conveyor or bucket and shown as a belt 80), dryer 50, and screen 60. To make feed pellet 100a, the dry mix of ingredients (which are optionally previously mixed in a dry mixer such as a blender, powder mixer or plow mixer and shown as a ribbon mixer 304 and stored in surge hopper 70), are fed into pin mixer 20. The binder from binder storage tank 72 is also fed (or sprayed) into pin mixer 20, where mixing occurs to form nucleus 110a (see FIG. 8A). A transfer system (e.g. belt or transfer conveyor and shown as a belt 85) then transports nuclei 110a to disc pelletizer 30, where additional amounts of feed (dry mix from storage hopper 70 or seed pellets from the pin mixer 20) and binder storage tank 72 are added. A transfer system (shown as conveyor belt 80) then transports feed pellet 100a from disc pelletizer 30 to dryer 50. A transfer system next transports feed pellet 100a from dryer 50 to screen 60. Feed pellets of suitable diameter passing through screen 60 are transferred to product storage bin 74. Oversized feed pellets retained on screen 60 or are of otherwise unsuitable size may be transferred and held in storage bin 76 and further transported back to storage hopper 70 for further processing (e.g. rescreening, subjected to size reduction, crushing, milling, discarding, etc., and shown as ground in a grinder 302 in FIG. 2) and/or recycling in a continuous process according to an alternative embodiment.

According to an alternative embodiment, the pellets may be formed using only the mixer (i.e. a pin mixer, paddle mixer, etc.). According to another alternative embodiment, further processing of the pellets is optional. For example, the further steps of growth tumble agglomeration (e.g. using a disc pelletizer), conditioning (e.g. using a dryer), and sizing (e.g. using a sieve with multiple screens) are optional according to alternative embodiments.

Agglomeration Generally

The nuclei of the feed pellets, and the resulting feed pellets themselves, are formed by a process of agglomeration. As used in this disclosure, the term "agglomeration" (also referred to as pelletization in this disclosure) refers to particle size enlargement in which small, fine particles are gathered into larger masses, clusters, pellets, or granules without high pressure (e.g. extrusion, briquetting, etc.). For example, agitation of the dry mix and the wetting binder in the agglomeration apparatus (e.g. pin mixer, paddle mixer, disc pelletizer, etc.) enhances particle to particle adhesion, i.e. as the particles collide they adhere to each other and agglomerate (with the aid of the binder).

As used in this disclosure, the term "growth tumble agglomeration" refers to agglomeration and growth through tumbling of a nucleus (also referred to as a green agglomerate, nuclei, or seed in this disclosure). Rotation of the nuclei (or the dry mix and binder itself) causes the wetted fines to form small, seed-type particles (i.e. a nucleation process). The moist agglomerates (i.e. nuclei) grow into larger, nearly spherical (or spheroidal) aggregates (or pellets) by coalescence (i.e. agglomerated particles attaching to other agglomerated particles) or layering (individual particles attaching to a nucleus), or both during a tumbling (i.e. spinning or rotating) process. This is also referred to as "snowballing" by coalescence to form larger particles.

Agglomeration by Mixing

The mixing apparatus is the place in which the dry mix and the binder are combined to produce the "seed" nuclei. According to an exemplary embodiment, the mixing apparatus is a high-shear pin mixer (also known as a pin agglomerator). The pin mixer may be configured to spray the liquid binder on the dry mix, thoroughly wetting the particles of the dry mix, and partially agglomerating the material to prepare it for final pelletizing in the growth tumble agglomerator apparatus. (The dry mix may be fed into one end of the mixing apparatus where the binder is sprayed simultaneously at an even or constant rate according to an exemplary alternative embodiment. According to an alternative embodiments, the binder could be provided to the pin mixer in batch along with the dry mix for subsequent or batch mixing.) Agglomeration in the pin mixer occurs when radially extended pins mounted on a high velocity central rotor shaft in a stationary cylindrical shell impart agitation forces on the dry mix and sprayed liquid binder. This causes a tumbling, turbulent movement resulting in densification of the dry mix and the binder. According to an alternative embodiment, the mixer may be a paddle mixer (also referred to as a paddle mixer agglomerator or "pug mill"). Such paddle mixers may include a series of paddles mounted on dual counter rotating shafts in a barrel shaped trough. With the addition of liquid binder, the material in the paddle mixer undergoes a tumbling, kneading, and medium-shear action as it travels through the paddles of the mixer. According to an exemplary embodiment, the mixer is a Mars Mineral model 12D54L Pin Mixer commercially available from Mars Mineral of Mars, Pa., USA.

Figure 3:
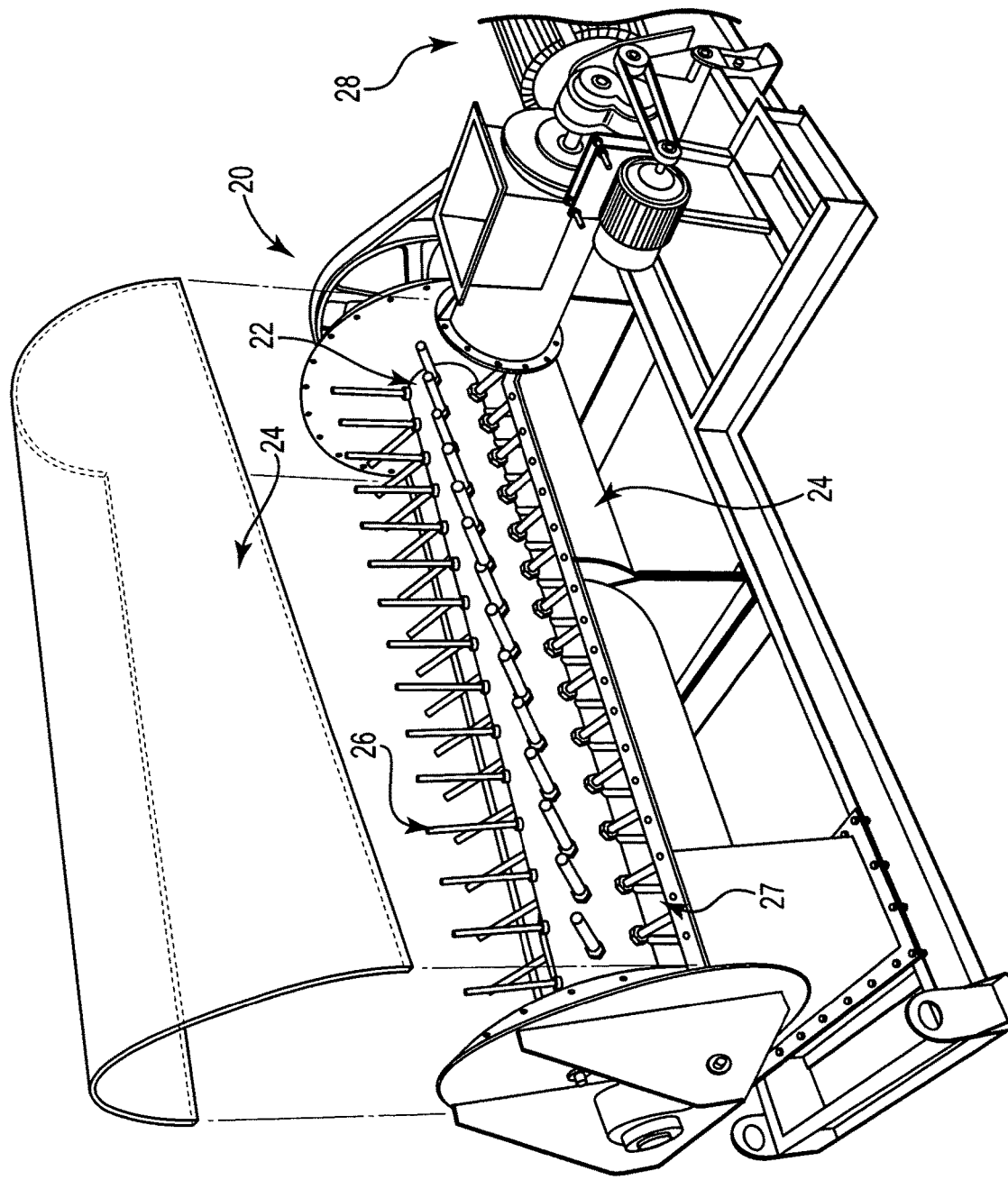
FIG. 3 is a partially exploded perspective view of a pin mixer agglomeration apparatus for making a feed pellet in accordance with an embodiment of the disclosure.

Referring to FIG. 3, pin mixer 20 is shown according to an exemplary embodiment. As show in FIG. 3, in pin mixer 20 includes a shaft 22 enclosed in a housing 24 (shown partially exploded in FIG. 3). Pins (shown as fingers 26) extend radially from shaft 22. A motor 28 drives rotation of shaft 22 so that ingredients in a reservoir 27 are mixed by fingers 26 thereby producing the seed nuclei.

Agglomeration by Tumbling

The growth tumble agglomeration apparatus is the place in which the nuclei (e.g. from the pin mixing apparatus) and additional dry mix and binder are tumbled to increase the size of the pellet. According to an exemplary embodiment, the growth agglomeration apparatus tumbles the ingredients in a disc pelletizer (also commonly referred to as a rotary drum agglomerator, drum granulator, and drum pelletizer). The disc pelletizer is used to define and agglomerate by coalescing the nuclei. The disc pelletizer uses the process of disc pelletization (also called "pan granulation"). According to this process, the dry mix and the nuclei are continually fed into a rotating pan, which are wetted by fine sprays (e.g. atomized mist) of the binder. (The dry mix and the binder are conveyed to the disc pelletizer at an even or constant rate according to an exemplary alternative embodiment.) A tumbling action in the pan first forms (or increases the size of the pre-formed) nuclei, which grow into larger pellets by coalescence or low-pressure compaction of fines (e.g. dry mix). Edges of the pellets are smoothed during tumbling (e.g. a "polishing" step). Spherically shaped pellets may be continuously discharged over the lip of the pan due to the speed and angle of inclination of the pan and the size and density of the pellet. According to an exemplary embodiment, the growth agglomeration apparatus is a Mars Mineral model P30 Disc Pelletizer commercially available from Mars Mineral of Mars, Pa., USA having a pan diameter of 3 feet, a pan depth of 8 inches, a pan speed range of 12.5-37 rpm and an angle range from horizontal of 40-60 degrees.

Figure 4:
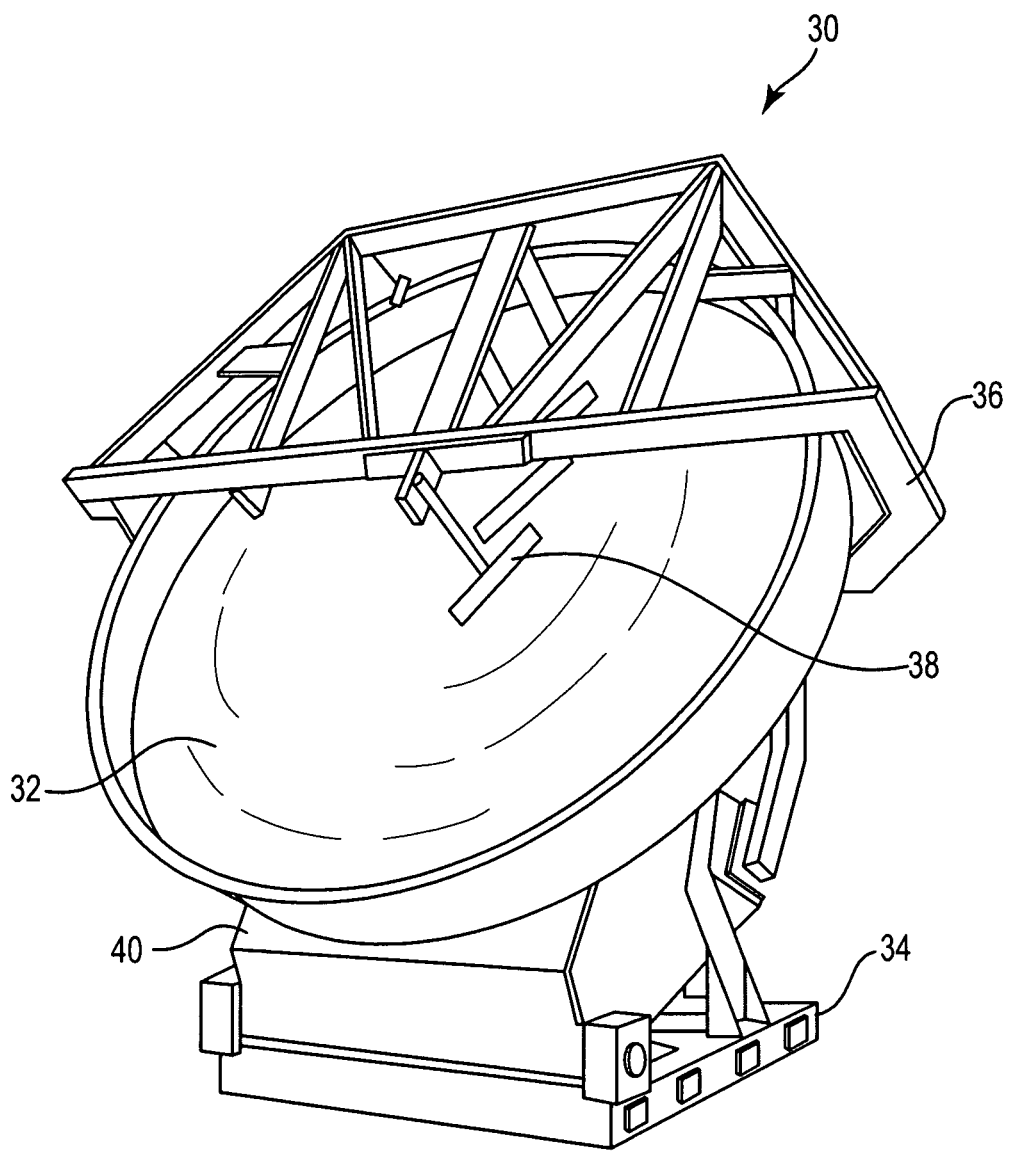
FIG. 4 is perspective view of a disc pelletizer growth tumble agglomeration apparatus for making a feed pellet in accordance with an embodiment of the disclosure.

Referring to FIG. 4, growth tumble agglomeration apparatus (shown as disc pelletizer 30) for making feed pellet 100a (see FIG. 8A) is shown in accordance with an embodiment of the disclosure. Disc pelletizer 30 includes an open-ended pan or inner disc 32 configured to rotate or spin about its center or origin. As shown in FIG. 4, the angle of inner disc 32 is shown about 50 degrees from horizontal. (According to alternative embodiments, the disc angle may be quickly and easily adjusted (e.g. by a hand-wheel operated jacking screw) from 40° to 60° relative to a horizontal plane.) Disc pelletizer 30 is shown having a base 34 and a plow support member 36 to provide rigidity, while simultaneously allowing rapid pan angle adjustment without the need for separate plow adjustment. As further shown in FIG. 4, an individually mounted vane 38 is configured to plow material easily and to control and maintain a product layer over the entire surface of inner disc 32. Referring further to FIG. 4, a pivot base 40 is shown as a rotating member, which may be mounted on heavy-duty anti-friction bearings according to certain embodiments. According to an exemplary embodiment, the disc pelletizer is constructed of heavy, welded, reinforced carbon steel plate, and the inner disc is about six feet in diameter and lined with expanded metal (or ceramic according to an alternative embodiment) to reduce abrasive wear.

According to alternative embodiments, the growth tumble agglomeration apparatus may be a disc pelletizer, disc pan, pelletizing or rotating drum, etc. which operate at atmospheric pressure and room temperature. According to other alternative embodiments, the pellet may be a strand, a crumble, a nugget, etc.

According to another alternative embodiment, any number of ingredients may be used in the mixer. Further, different ingredients may be used in the mixers (e.g. one type of ingredient combination may be used in the mixer (i.e. paddle mixer, pin mixer, etc.) and a different ingredient or ingredient combination may be used in the growth tumble agglomerator (e.g. disc pelletizer).

Referring to FIG. 5A, a perspective view of pellet 100a made by growth tumble agglomeration is shown according to an exemplary embodiment. Referring to FIG. 5B, a cross-sectional view of a pellet 100a along line 5B-5B of FIG. 5A is shown according to an exemplary embodiment. Pellet 100a includes a crusty outer layer 102a and an interior core 104a (see FIG. 5B). Outer layer 102a is shown having a different consistency and made of primarily a different ingredient than interior core 104a. For example, the outer layer may be molasses binder that is drawn from the interior core to the outer layer via capillary action during drying of the pellet.

Referring to FIG. 6A, a perspective view of a pellet 100b made by growth tumble agglomeration is shown according to an exemplary embodiment. Referring to FIG. 6B, a cross-sectional view of a pellet 100b along line 6B-6B of FIG. 6A is shown according to an exemplary embodiment. Pellet 100b includes an outer layer 102b and an interior core 104b (see FIG. 6B). As shown in FIG. 6B, included ingredients 106 are shown agglomerated in interior core 106 of pellet 100b. The included ingredients may include, for example, calcium carbonate, salt, magnesium, trace minerals, etc.

Figure 7:
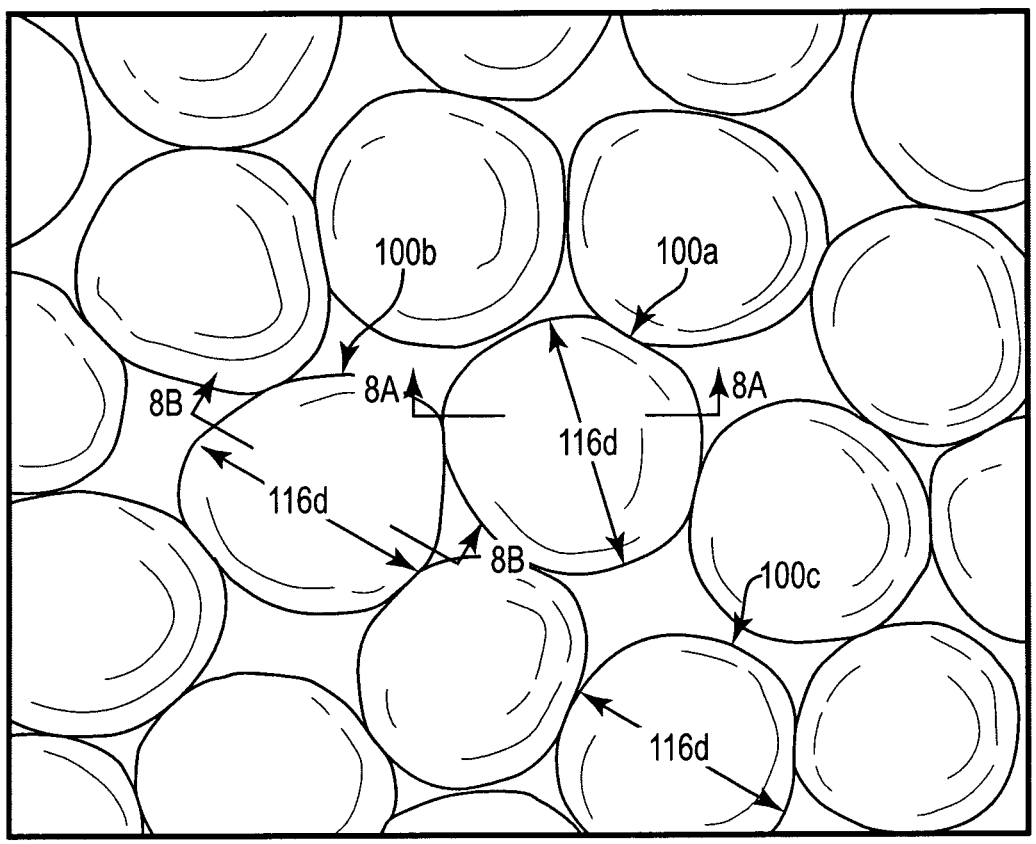
FIG. 7 is top-plan view of feed pellets made by growth tumble agglomeration in accordance with an embodiment of the disclosure.

Referring to FIG. 7, a top plan view of pellets 100a, 100b, and 100c made by growth tumble agglomeration in accordance with an embodiment of the disclosure is shown. Each of the pellets has a generally spherical shape with a major diameter 116d. As used in this disclosure, the term "major diameter" means the longest distance from one exterior point on the circumference of the pellet (or nucleus) to another exterior point on the circumference of the pellet (or nucleus).

Figure 8A:
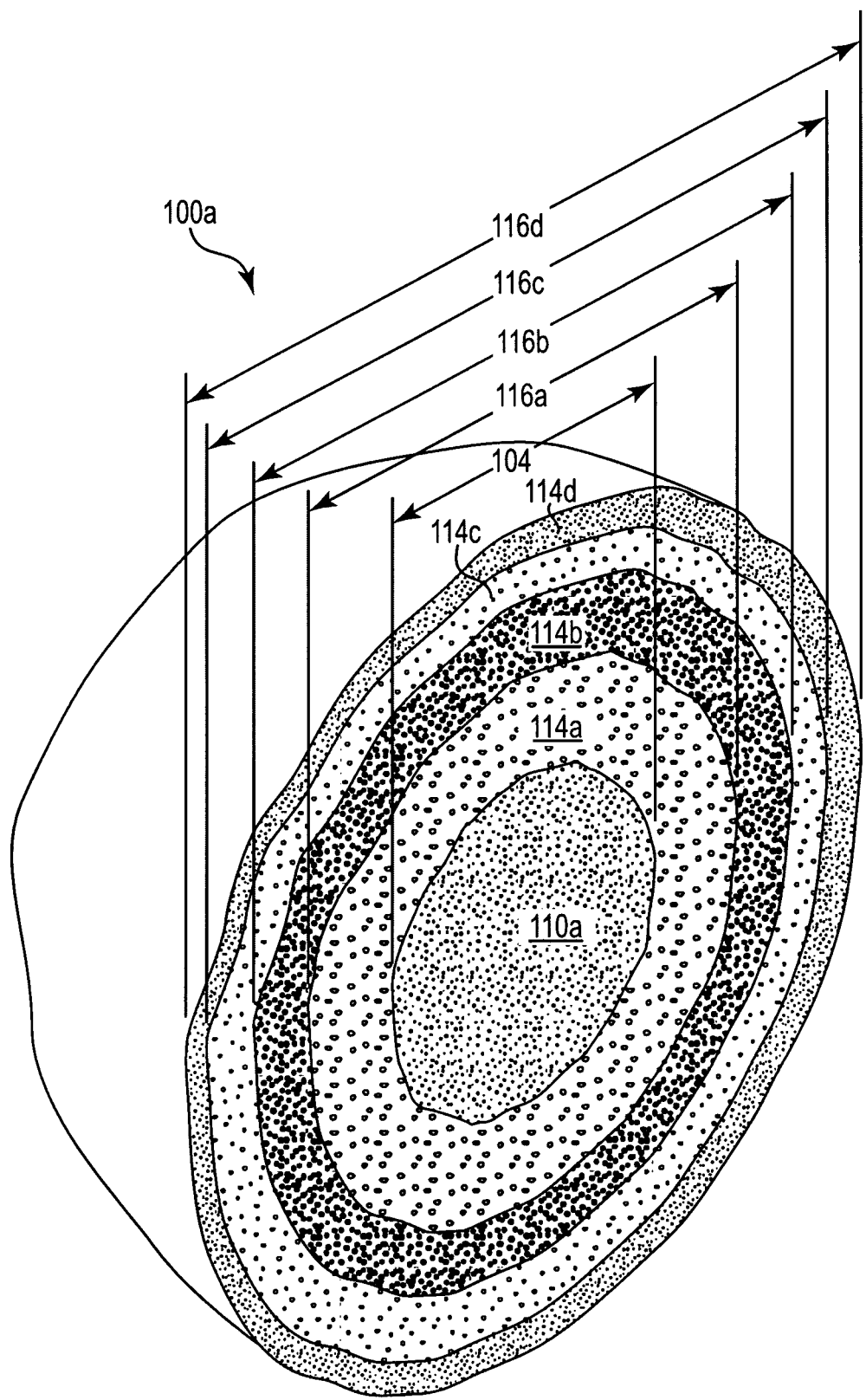
FIG. 8A is cross-sectional view of a feed pellet of FIG. 7 along line 8A-8A of FIG. 7.

Referring to FIG. 8A, a cross-sectional view of pellet 100a of FIG. 7 along line 8A-8A of FIG. 7 is shown. As shown in FIG. 8A, pellet 100a includes nucleus 110a having a major diameter 104. Nucleus 110a is shown surrounded by layers 114*a*, 114*b*, 114*c*, and 114*d*. Each of layers 114*a* through 114*d* are formed by deposition or layering of dry mix and binder on nucleus 110*a*. For example, layer 114*a* is shown substantially adhered to and surrounding nucleus 110*a*. Layer 114*b* grows from and around layer 114*a*. Layer 114*c* grows from and around layer 114*b*. Layer 114*d* grows from and around layer 114*d*. Each of layers 114*a* through 114*d* are shown generally spherical in shape. According to the embodiment shown in FIG. 8A, some of the layers (e.g. layer 114*d*) are substantially uniform in thickness, whereas other layers (e.g. layer 114*c*) vary in thickness. According to an alternative embodiment, the layer does not completely surround the nucleus. Each of layers 114*a* through 114*d* has a corresponding major diameter 116*a*, 116*b*, 116*c*, and 116*d*. According to an alternative embodiment, different binders may be used in any of the layers. According to another alternative embodiment, different ingredients may be used in any of the layers. According to an exemplary embodiment, the pellet has a major diameter falling within the ranges shown in TABLE A. According to a preferred embodiment, the pellet has a major diameter of between 3 U.S. mesh to 18 U.S. mesh.

Figure 8B:
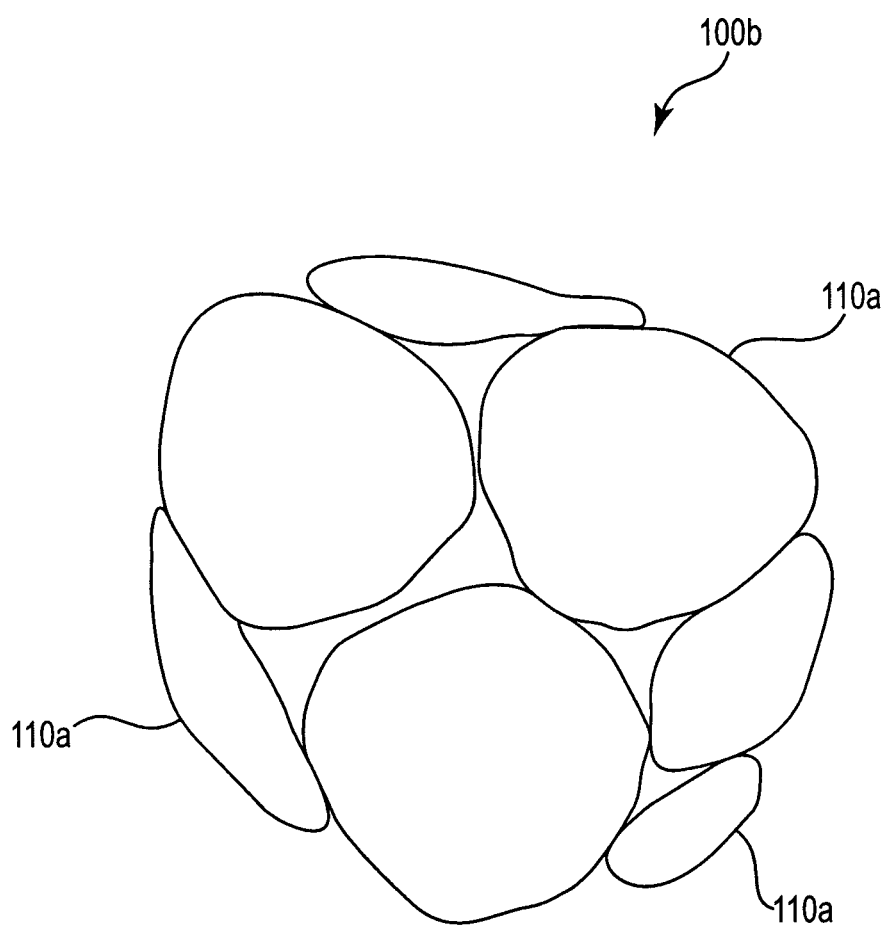
FIG. 8B is cross-sectional view of a feed pellet of FIG. 7 along line 8B-8B of FIG. 7 in accordance with an alternative embodiment of the disclosure.

Referring to FIG. 8B, a cross-sectional view of pellet 100*b* of FIG. 7 along line 8B-8B of FIG. 7 is shown in accordance with an alternative embodiment of the disclosure. Pellet 100*b* is formed by the aggregation of multiple nuclei 110*a* (e.g. formed by mixing in a pin or paddle mixer, formed by growth tumble agglomeration in a disc pelletizer, etc.). For example, multiple nuclei may be conveyed to a disc pelletizer where binder is added (e.g. optionally without any additional ingredients), and the nuclei are combined with each other into a substantially spherical pellet.

Figures 9A, 9B, 9C, 9D:
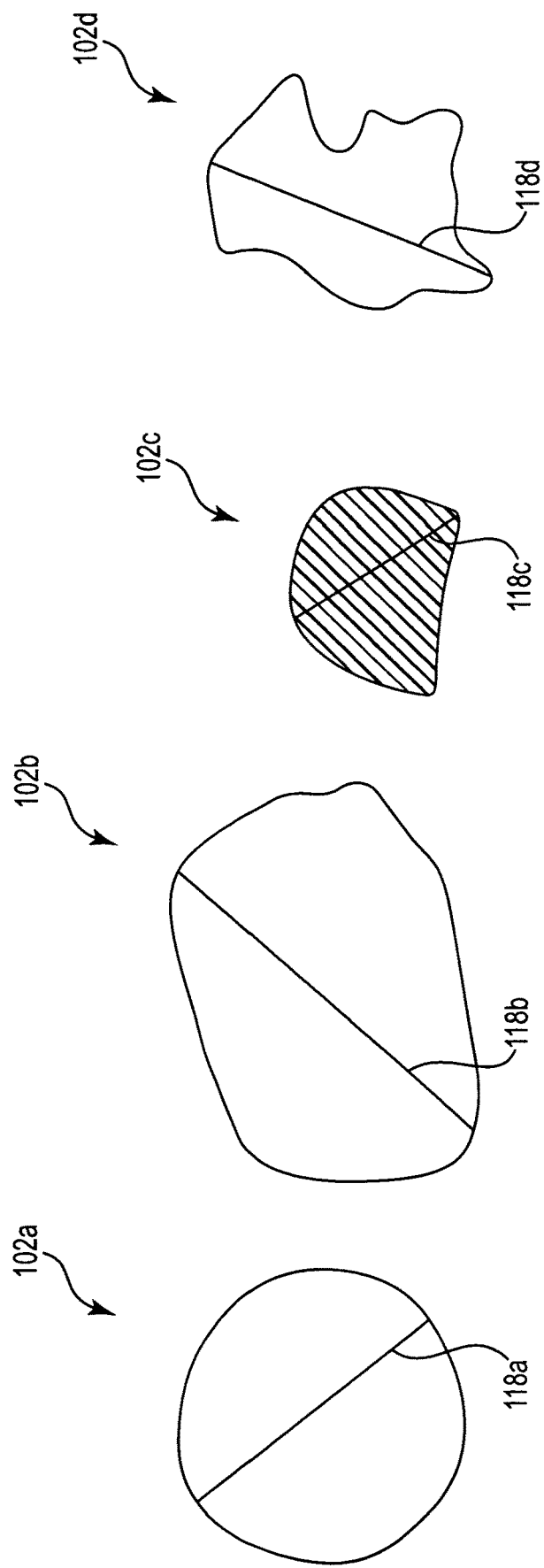
FIGS. 9A though 9D are cross-sectional views of feed pellets made by growth tumble agglomeration in accordance with various embodiments of the disclosure.

Referring to FIGS. 9A though 9D, cross-sectional views of pellets 102*a*, 102*b*, 102*c*, and 102*d* made by growth tumble agglomeration are shown in accordance with various embodiments of the disclosure. Pellet 102*a* is shown in FIG. 9A with an irregular circumference and having a major diameter 118*a*. Pellet 102*b* is shown in an alternative embodiment in FIG. 9B with an irregular circumference and having a major diameter 118*b*. Pellet 102*c* is shown in an alternative embodiment in FIG. 9C with an irregular circumference and having a major diameter 118*c*. Pellet 102*d* is shown in an alternative embodiment in FIG. 9D with an irregular circumference and having a major diameter 118*d*.

Conditioning

The conditioning apparatus is the place in which the pellet is further treated to obtain the pellet's final, permanent strength. According to alternative embodiments, such treatment may include heating, drying, cooling, etc. to change the characteristics of the pellets. According to an exemplary embodiment, the conditioning apparatus is a dryer. According to an alternative embodiment, the conditioning apparatus is a vibrating fluid bed dryer, which is optionally equipped with a cooling section. According to another alternative embodiment, the conditioning apparatus is a rotary kiln dryer. According to an exemplary embodiment, the conditioning apparatus is a combination rotary dryer/cooler. According to another exemplary embodiment, the conditioning apparatus is a virtual fluidized bed dryer model. According to another alternative embodiment, the pellet is dried using a forced-air dry oven at about 100 degrees Celsius until all moisture is completely removed.

Sorting

The feed pellets may be sorted in a sorting apparatus, for example a mechanical shaker or a vibrating multiple-deck screen. According to an exemplary embodiment, the sorting apparatus is a double-deck vibrating box screen. According to another alternative embodiment, the sorting apparatus is a vibratory screener. According to another alternative embodiment, the sorting apparatus is a sieve or shaker with multiple seen sizes.

The pellets may be sorted, for example, into three cuts using the screen: (i) undersized fines, (ii) acceptable product; and (iii) oversized. Each screen has a mesh size. As used in this disclosure, the term "mesh size" is the number of openings in one inch of screen. For example, a 4 U.S. mesh screen has four squares openings across one linear inch of screen. The term "−mesh size" as used in this disclosure means that all particles smaller than the designated mesh size would pass through the screen, and the term "+mesh size" as used in this disclosure means that all particles greater than the designated mesh size would be retained by the screen. A U.S. mesh size conversion chart is provided as TABLE A.

TABLE A

| U.S. MESH | INCHES | MICRONS | MILLIMETERS |
| --- | --- | --- | --- |
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |

Examples of suitable pellet sizes include pellets less than about 1.5 inches. Other examples of suitable pellet sizes include pellets of 1 U.S. mesh to 50 U.S. mesh. Still other examples of suitable pellet sizes include pellets of 3 U.S. mesh to 40 U.S. mesh. Yet other examples of suitable pellet sizes include pellets of 4 U.S. mesh to 35 U.S. mesh. Further examples of suitable pellet sizes include pellets of 4 U.S. mesh to 18 U.S. mesh. According to another embodiment, the particles have a major diameter of a magnitude less than $1/4$ inches diameter and greater than $1/16$ inches.

Animal Feed

The pellet is an animal feed according to an exemplary embodiment. The term "animal feed" as used in this disclosure means a feed ration and/or supplement produced for consumption by an animal. The term "animals" as used in this disclosure include, for example, bovine, porcine, equine, caprine, ovine, avian animals, seafood (aquaculture) animals, etc. Bovine animals include, but are not limited to, buffalo, bison, and all cattle, including calves, steers, heifers, cows, and bulls. Porcine animals include, but are not limited to, feeder pigs and breeding pigs, including piglets, sows, gilts, barrows, and boars. Equine animals include, but are not limited to, horses, including foals, mares, geldings and stallions. Caprine animals include, but are not limited to, goats, including does, bucks, wethers, and kids. Ovine animals include, but are not limited to, sheep, including ewes, rams, wethers, and lambs. Avian animals include, but are not limited to, birds, including chickens, turkeys, ducks, and ostriches (and also include domesticated birds also referred to as poultry). Seafood animals (including from salt water and freshwater sources) include, but are not limited to, fish and shellfish (such as clams, scallops, shrimp, crabs and lobster). The term "animals" as used in this disclosure also include ruminant and monogastric animals. As used in this disclosure, the term "ruminant" means any mammal that has a multi-compartment stomach and is associated with digestion by regurgitation and repeated chewing of a bolus or cud. Such ruminant mammals include, but are not limited to, cattle, goats, sheep, giraffes, bison, yaks, water buffalo, deer, camels, alpacas, llamas, wildebeest, antelopes and pronghorns. The term "animals" as used in this disclosure also includes domesticated animals (e.g. dogs, cats, rabbits, etc.), and wildlife (e.g. deer).

The pellet may include a compound animal feed according to an exemplary embodiment. The term "compound feed" as used in this disclosure means an animal feed blended to include two or more ingredients which assist in meeting certain daily nutritional requirements of an animal. The pellet may be a complete animal feed according to an exemplary embodiment. The term "complete feed" as used in this disclosure means an animal feed which is a complete feed, i.e. a nutritionally balanced blend of ingredients designed as the sole ration to provide all the daily nutritional requirements of an animal to maintain life and promote production without any additional substances being consumed except for water. The pellet may also be a concentrate animal feed according to an exemplary embodiment. The term "concentrate feed" as used in this disclosure means an animal feed that typically includes a protein source blended with supplements or additives or vitamins, trace minerals, other micro ingredients, macro minerals, etc. to provide a part of the ration for the animal. The concentrate feed may be fed along with other ingredients (e.g. forages in ruminants). The pellet may include a premix according to an alternative embodiment. As used in this disclosure, the term "premix" means a blend of primarily vitamins and/or minerals along with appropriate carriers in an amount of less than about five percent (5.0%) inclusion per ton of complete feed. The pellet may also include a base mix according to an exemplary embodiment. The term "base mix" as used in this disclosure means a blend containing vitamins, trace minerals and/or other micro ingredients plus macro minerals such as calcium, phosphorus, sodium, magnesium and potassium, or vitamin or trace mineral in an amount of less than ten percent (10.0%) inclusion per ton of complete feed. The pellet may be a feed "supplement." The term "supplement" as used in this disclosure means an ingredient such as a protein source, salt, mineral, additive, or buffer that is added to an animal feed. An example of a supplement includes the calcium, zinc, manganese, copper, iodine, cobalt, selenium and other trace ingredients BEEFMAX supplement commercially available from Cargill, Incorporated of Wayzata, Minn., USA.

Nutrients Generally and Specific Ingredients

The pellet is the vehicle to deliver nutrients to the animal. There are six major classes of nutrients: carbohydrates, fats, minerals, protein, vitamin, and water. These nutrient classes can be categorized as either macronutrients (needed in relatively large amounts) or micronutrients (needed in smaller quantities). The macronutrients are carbohydrates, fats, fiber, proteins, and water. The micronutrients are minerals and vitamins. The macronutrients (excluding water) provide structural material (amino acids from which proteins are built, and lipids from which cell membranes and some signaling molecules are built) and energy. Vitamins, minerals, fiber, and water do not provide energy, but are required for other reasons. Micronutrients include antioxidants and phytochemicals. Nutrients are delivered by sources of ingredients.

Macromineral (also referred to as bulk minerals) nutrients include, for example, calcium, chlorine (as chloride ions), magnesium, phosphorus, potassium, sodium, and sulfur. Micromineral (also referred to as trace minerals) nutrients include, for example, cobalt, copper, chromium, iodine, iron, manganese, molybdenum, nickel, selenium, vandadium, and zinc.

The calcium macromineral nutrient is a common electrolyte, and is also needed structurally (for muscle and digestive system health, bones, etc.) in an animal. Ingredient sources of the calcium nutrient include, for example: calcium carbonate, limestone, calcium chloride, calcium hydroxide, calcium sulfate, etc. According to one embodiment, the source of the calcium nutrient is Unical-P finely ground calcium carbonate from quarried high calcium limestone with minimum calcium content of 38% (for example, having a calcium content of 38.65% and a calcium carbonate content of 96.63%. According to another embodiment, the calcium carbonate ingredient has an average particle size of 10.11 microns (measured by laser diffraction). For example, one half of the particles have a particle size larger than 10.11 microns and one half the particles have a particle size less than 10.11. According to another example, the calcium carbonate is –200 mesh calcium carbonate. According to another embodiment, the particle size of the calcium carbonate has a distribution as shown in TABLE B.

TABLE B

Particle Distribution-U.S. Screen Comparison

| Minus 200 mesh product | | | |
|---|---|---|---|
| Micron Size | U.S. Screen | % Retained | % Passing |
| 300 | 50 | 0.0 | 100.0 |
| 212 | 70 | 0.0 | 100.0 |
| 180 | 80 | 0.0 | 100.0 |
| 150 | 100 | 0.0 | 100.0 |
| 75 | 200 | 3.2 | 96.8 |
| 45 | 325 | 13.9 | 82.9 |
| 38 | 400 | 4.6 | 78.3 |
| 25 | 500 | 9.5 | 68.8 |
| 13 | 1000 | 13.4 | 55.4 |
| 6 | 2300 | 16.9 | 38.5 |
| 2.5 | Pan | 38.5 | |
| | | 100.0 | |

The added salt macromineral nutrient is needed in the nutrition of an animal for a variety of reasons (e.g. functions as osmotic pressure, acid-base balance and body-fluid balance, is involved in nerve transmission and active transport of amino acids, and is required for cellular uptake of glucose carrier protein). Ingredient sources of the added salt nutrient include, for example, one or more chloride salts suitable for use in an animal feed pellet such as calcium chloride, sodium chloride, potassium chloride, etc.

Vitamins nutrients include, for example, vitamin A. Ingredient sources of vitamin A include, for example, vitamin A supplement, vitamin A oil, etc. Vitamins also include, for example, vitamin B1, vitamin B2, vitamin B3, vitamin B4, vitamin B5, vitamin B6, vitamin B7, vitamin B9, vitamin B12, and vitamin C. Vitamins also include, for example, vitamin D. Ingredient sources of vitamin D include, for example, vitamin D supplement. Vitamins also include, for example, vitamin E. Ingredient sources of vitamin E include, for example, vitamin E supplement. Vitamins also include, for example, vitamin K. Other vitamin product ingredients may include, for example, riboflavin, vitamin D3 supplement, niacin, betaine, choline chloride, tocopherol, inositol, etc.

An example nutrient that is important in the nutrition of an animal is non-protein nitrogen (NPN). NPN may be fed to an animal as a replacement (in part) for protein. A source of NPN nutrient is available, for example, from the following ingredient sources: (i) ammoniated products (e.g. ammoniated molasses, ammoniated condensed distillers' molasses solubles, ammoniated citrus pulp, ammoniated beet pulp and ammoniated furfural (bran-type) residue; (ii) ammonium salts (e.g. diammonium phosphate (DAP) and monoammonium phosphate (MAP)); and (iii) urea. Urea ($CO(NH_2)_2$) typically contains 46.7 percent nitrogen. The microflora of the rumen can use NPN as a protein source. Ingredient sources of the non-protein nitrogen nutrient include organic nitrogen sources and inorganic nitrogen sources. Organic nitrogen sources may include, for example, urea, uric acid, and biuret. Another suitable nitrogen source may include ammonium salts such as ammonium acetate and inorganic ammonium salts such as ammonium sulfate, ammonium chloride, ammonium polyphosphate, diammonium phosphate, monoammonium phosphate, and the like. The urea may be obtained from any of a number of suitable sources and in any of a number of suitable forms. For example, the urea may be microprilled or rolled urea.

Ingredients Generally

The pellet may include a combination or compound of various ingredients to deliver the nutrients. Examples of ingredients include protein ingredients, grain products, grain by-products, roughage products, fats, minerals, vitamins, additives or other ingredients according to an exemplary embodiment. Protein ingredients may include, for example, animal derived proteins such as: dried blood meal, meat meal, meat and bone meal, poultry by-product meal, hydrolyzed feather meal, etc. Protein ingredients may also include, for example, marine products such as: fish meal, crab meal, shrimp meal, condensed fish solubles, fish protein concentrate, etc. Protein ingredients may further include, for example, plant products such as: algae meal, beans, coconut meal, cottonseed meal, rapeseed meal, canola meal, linseed meal, peanut meal, soybean meal, sunflower meal, peas, soy protein concentrate, dried yeast, active dried yeast, etc. Protein ingredients may also include, for example, milk products such as: dried skim milk, condensed skim milk, dried whey, condensed whey, dried hydrolyzed whey, casein, dried whole milk, dried milk protein, dried hydrolyzed casein, etc. Grain product ingredients may include, for example, corn, milo, oats, rice, rye, wheat, etc. Grain by-product ingredients may also include, for example, corn bran, peanut skins, rice bran, brewers dried grains, distillers dried grains, distillers dried grains with solubles, corn gluten feed, corn gluten meal, corn germ meal, flour, oat groats, hominy feed, corn flour, soy flour, malt sprouts, rye middlings, wheat middlings, wheat mill run, wheat shorts, wheat red dog, feeding oat meal, etc. Grain product ingredients may also include, for example high-moisture processed grain by-products. Such high-moisture processed grain by-products result from the processing of a number of different grains such as corn, wheat, and milo. Examples of high-moisture processed grain by-products include, without limitation, gluten, non-grain feed ingredients (e.g., molasses, beet pulp and other crop residues), and wet distiller's grain. Another example of a high-moisture processed grain by-product is a commercial product marketed under the trade name SWEETBRAN® (Cargill, Incorporated of Minnetonka, Minn.). Roughage product ingredients may include, for example, corn cob fractions, barley hulls, barley mill product, malt hulls, cottonseed hulls, almond hulls, sunflower hulls, oat hulls, peanut hulls, rice mill byproduct, bagasse, soybean hulls, soybean mill feed, dried citrus pulp, dried citrus meal, dried apple pomace, dried tomato pomace, straw, hay, etc. Fat product ingredients may include, for example, beef fat, poultry fat, pork fat, restaurant grease, soy oil, corn oil, tallow, hydrolyzed animal fat, hydrolyzed vegetable fat, calcium salts of long chain fatty acids, hydrogenated glycerides, etc. Mineral product ingredients may include, for example, basic copper chloride, bone ash, bone meal, calcium acetate, calcium carbonate, calcium chloride, calcium gluconate, calcium hydroxide, calcium iodate, calcium iodobehenate, calcium oxide, calcium sulfate (anhydrous or dihydrate), cobalt acetate, cobalt carbonate, cobalt chloride, cobalt oxide, cobalt sulfate, copper carbonate, copper chloride, copper gluconate, copper hydroxide, copper orthophosphate, copper oxide, copper pyrophosphate, copper sulfate, cuprous iodide, dicalcium phosphate, diiodosalicylic acid, disodium phosphate, ethylenediamine dihydroiodide, ferrous fumarate, iron ammonium citrate, iron carbonate iron chloride, iron gluconate, iron oxide, iron phosphate, iron pyrophosphate, iron sulfate, reduced iron, magnesium acetate, magnesium carbonate, magnesium oxide, magnesium sulfate, manganese acetate, manganese carbonate, manganese chloride, manganese citrate (soluble), manganese gluconate, manganese orthophosphate, manganese oxide, manganese phosphate (dibasic), manganese sulfate, monocalcium phosphate, monosodium phosphate, dicalcium phosphate, phosphate deflourinated, rock phosphate, potassium acetate, potassium bicarbonate, potassium carbonate, potassium chloride, potassium iodate, potassium iodide, potassium, sulfate sodium acetate, sodium chloride, sodium bicarbonate, sodium iodate, sodium iodide, sodium sulfate, sodium, sodium sesquincarbonate, selenium, sulfur, thymol iodide, tricalcium phosphate, tripolyphosphate, zinc acetate, zinc carbonate, zinc chloride, zinc oxide, zinc sulfate, etc.

Vitamin product ingredients may include, for example, vitamin A supplement, vitamin A oil, vitamin D, vitamin B12 supplement, vitamin E supplement, riboflavin, vitamin D3 supplement, niacin, betaine, choline chloride, tocopherol, inositol, etc. Additive product ingredients can be used, for example, to protect animals from disease and/or stress (e.g. anitbiotics, probiotics, etc.) and/or to stimulate or control growth and behavior (e.g. hormones).

Feed additives can be used, for example, to help provide a balanced diet (e.g., vitamins and/or trace minerals), to protect the animals from disease and/or stress (e.g., antibiotics, probiotics) and/or to stimulate or control growth and behavior (e.g., hormones). Additive product ingredients may include, for example: growth promoters, medicinal substances, buffers, antioxidants, enzymes, preservatives, pellet-binding agents, direct-fed microbials, etc. Additive product ingredients may also include, for example, ionophores (e.g. monesin, lasalocid, laidlomycin, etc.), β-agonist (zilpaterol, ractompamine, etc.), antibiotics (e.g., chlortetracycline (CTC), oxytetracycline, bacitrain, tylosin, aureomycin), probiotics and yeast cultures, coccidiostats (e.g., amprollium, decoquinate, lasalocid, monensin), and hormones (e.g., growth hormones or hormones that inhibit estrus and/or ovulation such as melengestrol acetate), pheromones, nutraceuticals, pharmaceuticals, flavanoids, nutritive and non-nutritive supplements, detoxicants, etc. Some commercially available additives are sold under the trade names RUMENSIN®, BOVATEC®, DECCOX®, TYLAN®, OPTAFLEXX®, and MGA®.

Still other product ingredients may include, for example, urea, sugar, cane molasses, dried cane molasses, beet molasses, dried beet molasses, citrus molasses, bentonite, clay, etc.

According to an exemplary embodiment, the ingredients have a size in the range of <10 um to <200 um. According to another alternative embodiment, the ingredients of the dry mix may be sized (e.g. via grinding) before their addition to the mixing apparatus and/or the agglomeration apparatus.

According to an exemplary embodiment, the ingredient includes at least 10 weight percent corn relative to the total weight of the pellet. According to other exemplary embodiments, the ingredient includes at least 20-80 weight percent corn, 30-70 weight percent corn, 40-60 weight percent corn, or at least 50 weight percent corn, all relative to the total weight of the pellet. According to another exemplary embodiment, the ingredient includes at least 10 weight percent protein relative to the total weight of the pellet. According to other exemplary embodiments, the ingredient includes at least 20-80 weight percent protein, 30-70 weight percent protein, 40-60 weight percent protein, or at least 50 weight percent protein, all relative to the total weight of the pellet.

Binder

The pellet includes the binder according to an exemplary embodiment. During processing, the binder is in liquid form according to an exemplary embodiment. According to some embodiments, the binder is water soluble (i.e. hydrophilic). Examples of water-soluble binders include lignosulfonate. According to one embodiment, the binder is lignin-based such as, for example: (i) Norlig 12 Sodium Lignosulfonate (Hardwood), Norlig A Calcium Lignosulfonate (Hardwood), D-1262 Developmental Sodium Lignin (Softwood), D-1736 Desugared Calcium Lignosulfonate (Hardwood), all commercially available from Lignotech USA, Inc. of Rothschild, Wis.; (ii) Lignin Calcium Lignin commercially available from Westway Trading Corporation of Oak Forest, Ill., USA; and (iii) Cane-Lignin Water Blend commercially available from Westway Trading Corporation of Oak Forest, Ill., USA.

Another example of a water-soluble binder is molasses. Molasses is an organic by-product of cane or beet sugar refining. It is a residual heavy syrup left after the crystallization process. Cane molasses is derived as a by-product from fermentation industries (which use cane molasses) or from the production of alcohol, yeast, citric acid or other fermentation products. According to one exemplary embodiment, the molasses binder is Big Chief De-Sugarized Beet Molasses commercially available from Westway Trading Corporation of Oak Forest, Ill., USA. According to another exemplary embodiment, the molasses binder is Brix Cane Molasses commercially available from Westway Trading Corporation of Oak Forest, Ill., USA. According to another exemplary embodiment, the molasses binder is Carmil Glo (a blend of molasses and fat) commercially available from Westway Trading Corporation of Oak Forest, Ill., USA. Another example of a water soluble binder is corn syrup solids, which may provide some nutritional aspects (e.g. energy from starch) for the total feed ration.

Another example of a water-soluble binder includes a by-product of brewing. An example of such by-product includes "Brewex" materials, i.e. an organic modified starch brewery by-product containing glucose, maltose, and maltodextrin. Such by-product is an evaporative product derived from beer production residuals containing the above carbohydrates, protein, and water. An example of such a by-product is Brewex Brewers Condensed Solubles commercially available from Developing Environmental Resources of Elkhorn, Wis., USA.

Another example of a water-soluble binder is starch. Still another example of a water-soluble binder is sugar. Yet another example of a water-soluble binder is maltodextrin. A further example of a water-soluble binder is corn syrup solids. According to an alternative embodiment, the water-soluble binder is a blend, such as a blend of molasses, whey, and lignin. According to another exemplary embodiment, the blended water-soluble binder is Mol-Whey 63 Cane Molasses/Condensed Whey Mix commercially available from Westway Trading Corporation of Oak Forest, Ill., USA. Water is another example of a water-soluble binder. Other examples of water-soluble binders also include proteins, alginates, carageenans, etc. According to another embodiment, the binder is a non-protein nitrogen, such as, for example, urea, which is water-soluble and which provides nitrogen as a nutritional aspect.

According to some embodiments, the binder is from an organic material. Examples of organic binders include lignin binders, calcium lignosulfonate, etc. According to other embodiments, the binder is from an inorganic material. Examples of inorganic binders include water-soluble glasses generally manufactured by fusing high purity quartz sand (silicon dioxide) with an alkali metal such as sodium carbonate or potassium carbonate. Other examples of inorganic binders include potassium silicate, sodium silicate, lithium silicate, etc. According to still other embodiments, the binder may be a combination of an organic material and an inorganic material.

According to some embodiments, the binder may provide a significant part of the nutrition of the ration. According to other embodiments, the binder may not provide a significant part of the nutrition of the ration (e.g. water, lignin sulfonate, urea, etc.). According to other embodiments, the binder may be palatable to the animal (e.g. molasses). According to other embodiments, the binder may be 50% urea, molasses, bentonite, lignin sulfonate, sodium silicate and various gums, attapulgite clay, calcium aluminates, and dried or wet molasses.

According to another alternative embodiment, any number of binders may be used in the mixers. Further, different binders may be used in the mixers (e.g. one type of binder or binder combination may be used in the mixer (i.e. paddle mixer, pin mixer, etc.) and a different binder or binder combination may be used in the growth tumble agglomerator (e.g. disc pelletizer). According to another alternative embodiment, different binders may be used in the same mixer (e.g. water used as a binder during a first period of agglomeration, and molasses used as a binder during a second period of agglomeration).

According to other alternative embodiments, the binder can include one or more water insoluble (i.e. hydrophobic) or water stable binders. In some alternative embodiments, one or more water insoluble binders may be combined with one or more water soluble binders. Examples of water insoluble binders include hydrogenated oils, waxes, glycerides, gluten, etc.

According to some embodiments, the pellet may have the ingredient formulations as shown in TABLE C1 and the corresponding nutrient formulations as shown in TABLE C2, where such formulations are intended to be included in the total ration (as fed) according to the percent inclusion.

TABLE C1

| Ingredient | No Urea (1.75% inclusion of total ration) | Mid Urea (2% inclusion of total ration) | High Urea (2.35% inclusion of total ration) |
|---|---|---|---|
| Urea | 0% | 21% | 38% |
| Salt | 19% | 10% | 9% |
| Calcium Carbonate | 77% | 65% | 50% |
| Trace Mineral | 4% | 4% | 3% |
| Total | 100% | 100% | 100% |

TABLE C2

| Nutrient | No urea % nutrient (1.75% inclusion of total ration) | Mid urea % nutrient (2% inclusion of total ration) | High urea % nutrient (2.35% inclusion of total ration) |
|---|---|---|---|
| Protien, % | 0.00% | 60.38% | 109.25% |
| NPN, % | 0.00% | 9.87% | 17.86% |
| Fat, % | 0.00% | 0.00% | 0.00% |
| DM, % | 99.17% | 99.24% | 99.35% |
| Ash, % | 94.14% | 73.63% | 58.03% |
| Calcium, % | 31.65% | 26.61% | 20.45% |
| Phos, % | 0.03% | 0.03% | 0.02% |
| Magnesium, % | 0.17% | 0.14% | 0.11% |
| Potassium, % | 0.08% | 0.05% | 0.04% |
| Salt Added, % | 18.66% | 9.82% | 8.84% |
| Cobalt, MG/KG | 20.23 | 20.12 | 15.11 |
| Copper, MG/KG | 736.29 | 733.42 | 550.39 |
| Iodine, MG/KG | 64 | 64 | 48 |
| Iron, MG/KG | 266.65 | 213 | 166.48 |
| Manganese, MG/KG | 2543.64 | 2501 | 1880.58 |
| Selenium, MG/KG | 14.4 | 14.4 | 10.8 |
| Zinc, MG/KG | 3601 | 3600 | 2700 |

According to another alternative embodiment, the pellet may have nutrient amounts in the following ranges when fed at 2.35% inclusion or less: (i) added salt 0-20%, for example 5-20%, also for example 9-19%, for further example 10-15%; (ii) calcium 0-40%, for example 10-30%, also for example, 15-25%, for further example 20-30%; (iii) non-protein nitrogen 0-150%, for example 25-110%, also for example 50-100%, for further example 60-100%; (iv) minerals 0-100%, for example 1-10%, also for example 1-5%, for further example 2-5%.

In some embodiments, a mineral feed supplement can include nutrient amounts as follows: a calcium nutrient comprises 1%-40%; an added salt nutrient comprises 1%-20%; a non-protein nitrogen nutrient comprises 0%-100%; a vitamin comprises 0%-5%; and a trace mineral comprises 0%-5%.

In some embodiments, a mineral feed supplement can include ingredient amounts as follows: a calcium ingredient comprises 40 wt %-80 wt % (e.g., 50-80 percent by weight of the mineral feed supplement); an added salt ingredient comprises 5 wt %-20 wt % (e.g., an added chloride salt ingredient from 5-20 percent by weight of the mineral feed supplement, from 15-20 percent by weight of the mineral feed supplement, etc); a non-protein ingredient nutrient comprises 0 wt %-40 wt %; a vitamin comprises 0 wt %-5 wt %; and a trace mineral comprises 1 wt %-5 wt %. In some embodiments, a mineral feed supplement can include ingredient amounts as follows: a calcium ingredient comprising calcium carbonate in the amount of 40 wt %-80 wt %, an added salt ingredient comprising salt in the amount of 5 wt %-15 wt %, and a non-protein ingredient nutrient comprising urea in the amount of 0 wt %-40 wt %.

Poultry Ration

According to an exemplary embodiment, the pellet is a complete prestarter base feed for poultry, having a binder (e.g. molasses, water, etc.) with the combination of ingredients as shown in Table D. According to another exemplary embodiment, the pellet is a complete starter base feed for poultry, having a binder (e.g. molasses, water, etc.) with the combination of ingredients as shown in Table D. According to still another exemplary embodiment, the pellet is a complete grower base feed for poultry, having a binder (e.g. molasses, water, etc.) with the combination of ingredients as shown in Table 2. According to yet another exemplary embodiment, the pellet is a complete finisher base feed for poultry, having a binder (e.g. molasses, water, etc.) with the combination of ingredients as shown in Table D.

TABLE D

| Ingredient | Prestarter BASE (wt %) | Starter BASE (wt %) | Grower BASE (wt %) | Finisher BASE (wt %) |
|---|---|---|---|---|
| Corn, finely ground | 55.933 | 55.502 | 60.828 | 65.995 |
| Soybean meal, 48% | 37.299 | 36.410 | 31.380 | 26.179 |
| Salt | 0.442 | 0.380 | 0.367 | 0.359 |
| Calcium carbonate | 1.528 | 1.608 | 1.500 | 1.448 |
| Phosphate - mono dicalcium | 1.307 | 1.141 | 0.879 | 0.793 |
| Fat - Poultry | 2.723 | 4.198 | 4.447 | 4.638 |
| Choline chloride-60 | 0.102 | 0.068 | 0.033 | 0.017 |
| Sodium bicarbonate | 0.049 | 0.152 | 0.135 | 0.109 |
| DL Methionine - dry | 0.260 | 0.233 | 0.199 | 0.169 |
| L-Lysine HCl | 0.091 | 0.059 | 0.027 | 0.064 |
| Threonine | 0.050 | 0.033 | 0.024 | 0.047 |
| PHY9 Phyzy D10000 P | 0.007 | 0.007 | 0.007 | 0.007 |
| Broiler vitamin premix | 0.150 | 0.150 | 0.125 | 0.125 |
| Poultry trace mineral premix | 0.060 | 0.060 | 0.050 | 0.050 |

Pork Ration

According to an exemplary embodiment, the pellet is a complete corn-based phase 1 (first two weeks in the nursery) starter feed for piglets, having a binder (e.g. molasses, water, etc.) with the combination of ingredients as shown in TABLE E. According to another exemplary embodiment, the pellet is a complete wheat and barley-based phase 1 feed for piglets, having a binder (e.g. molasses, water, etc.) with the combination of ingredients as shown in TABLE E. According to still another exemplary embodiment, the pellet is a complete high by-product-based phase 1 feed for piglets, having a binder (e.g. molasses, water, etc.) with the combination of ingredients as shown in TABLE E.

TABLE E

| Ingredient | Corn-based (wt %) | Wheat/barley (wt %) | High By-product (wt %) |
|---|---|---|---|
| Salt | 0.279645 | 0.411295 | 0.269706 |
| Limestone | 1.472222 | 1.329373 | 1.232576 |
| Canola meal | 0 | 0 | 3 |
| Phosphate - mono dicalcium | 0.464181 | 0.736446 | 0.466144 |
| Fat - Poultry | 1.292248 | 1.952256 | 4 |
| L-Lysine HCl | 0.057651 | 0.128243 | 0.218445 |
| Sunflower meal 32% protein | 0 | 0 | 3 |
| Wheat midds by-product 27-34% neutral detergent fiber ("NDF") | 17.5 | 0 | 14.987229 |
| Barley - ground | 0 | 31.464355 | 15 |
| Soybean meal, 48% | 20.90163 | 19.109765 | 12.685394 |
| Palm kernel meal - expeller | 0 | 0 | 3 |
| Beet pulp | 0 | 0 | 2.349998 |
| Corn, finely ground | 49.28 | 0 | 11.82 |

TABLE E-continued

| Ingredient | Corn-based (wt %) | Wheat/barley (wt %) | High By-product (wt %) |
|---|---|---|---|
| Standard vitamin-mineral premix | 0.75 | 0.75 | 0.75 |
| Grains - distillers with solubles | 8 | 3.918268 | 7.219787 |
| Wheat - ground 8-14% NDF | 0 | 40 | 20 |

According to an exemplary embodiment, the pellet is a complete nursery feed for pigs, having a binder (e.g. molasses, water, etc.) with the combination of ingredients as shown in TABLE F.

TABLE F

| Ingredient | (wt %) |
|---|---|
| Corn, finely ground | 50.0279 |
| Soybean meal, 48% | 15.0 |
| Salt | 0.1 |
| Calcium carbonate | 0.3954 |
| Phosphate - mono dicalcium | 0.732 |
| Soybean protein concentrate | 4.2665 |
| Tryotophan 100% | 0.0095 |
| Fat - Poultry | 1.5486 |
| Choline chloride-60 | 0.1291 |
| Zinc oxide-72 | 0.016 |
| DL Methionine - dry | 0.1831 |
| L-Lysine HCl | 0.4 |
| Threonine | 0.131 |
| HQ select menhaden fish | 5.0 |
| Plasma - dried | 5.0 |
| Lactose - crude | +0.0 |
| Whey permeate | 16.6604 |
| Pork nursery-finisher vitamin | 0.05 |
| Pork trace mineral | 0.1 |
| Saccharin | 0.0327 |
| *Bacillus* - calsporin 600 | 0.018 |
| ACID-PROMOTE AD 202 | 0.2 |

According to an exemplary embodiment, the pellet is a complete corn-based phase 2 (i.e. grower) for pigs, having a binder (e.g. molasses, water, etc.) with the combination of ingredients as shown in TABLE G. According to another exemplary embodiment, the pellet is a complete wheat and barley-based phase 1 feed for pigs, having a binder (e.g. molasses, water, etc.) with the combination of ingredients as shown in TABLE G. According to still another exemplary embodiment, the pellet is a complete high by-product-based phase 1 feed for pigs, having a binder (e.g. molasses, water, etc.) with the combination of ingredients as shown in TABLE G.

TABLE G

| Ingredient | Corn-based (wt %) | Wheat/barley (wt %) | High By-product (wt %) |
|---|---|---|---|
| Salt | 0.303137 | 0.397545 | 0.301749 |
| Limestone | 1.451638 | 1.28231 | 1.037116 |
| Canola meal | 0 | 0 | 6 |
| Phosphate - mono dicalcium | 0.296332 | 0.608209 | 0.483484 |
| Fat - poultry | 1.2 | 1.651796 | 3.5 |
| L-Lysine HCl | 0.00986 | 0.057645 | 0.143471 |
| Sunflower meal 32% protein | 0 | 0 | 5 |
| Wheat midds by-product 27-34% NDF | 20 | 0 | 14.46177 |
| Barley - ground | 0 | 34.2 | 5.2 |
| Soybean meal, 48% | 16.666313 | 15.86025 | 8.446735 |
| Palm kernel meal - expeller | 0 | 0 | 5 |
| Beet pulp | 0 | 0 | 3.177034 |
| Corn, finely ground | 49.57 | 0 | 23.534061 |

TABLE G-continued

| Ingredient | Corn-based (wt %) | Wheat/barley (wt %) | High By-product (wt %) |
|---|---|---|---|
| Standard vitamin-mineral premix | 0.5 | 0.5 | 0.5 |
| Grains - distillers with solubles | 10 | 5.435004 | 3.214579 |
| Wheat - ground 8-14% NDF | 0 | 40 | 20 |

According to an exemplary embodiment, the pellet is a complete corn-based phase 3 (i.e. finisher) feed for pigs, having a binder (e.g. molasses, water, etc.) with the combination of ingredients as shown in TABLE H. According to another exemplary embodiment, the pellet is a complete wheat and barley-based phase 3 feed for pigs, having a binder (e.g. molasses, water, etc.) with the combination of ingredients as shown in TABLE H. According to still another exemplary embodiment, the pellet is a complete high by-product-based phase 3 feed for pigs, having a binder (e.g. molasses, water, etc.) with the combination of ingredients as shown in TABLE H.

TABLE H

| Name | Corn-based (wt %) | Wheat/barley (wt %) | High By-product (wt %) |
|---|---|---|---|
| Salt | 0.2 | 0.248792 | 0.278615 |
| Limestone | 1.534526 | 1.159264 | 0.894409 |
| Canola meal | 0 | 0 | 7.5 |
| Phosphate - mono dicalcium | 0.137131 | 0.434423 | 0.593187 |
| Fat - poultry | 2.262931 | 2.765025 | 4 |
| L-Lysine HCl | 0.063472 | 0.093605 | 0.153046 |
| Sunflower meal 32% Protein | 0 | 0 | 7 |
| Wheat midds by-product 27-34% NDF | 27 | 15.2 | 11.512543 |
| Barley - ground | 0 | 20.803547 | 10 |
| Soybean meal, 48% | 9.191447 | 8.795344 | 2.777251 |
| Palm kernel meal - expeller | 0 | 0 | 5 |
| Beet pulp | 0 | 0 | 5.361777 |
| Corn, finely ground | 40.87 | 0 | 18.63 |
| Standard vitamin-mineral premix | 0.5 | 0.5 | 0.5 |
| Grains - distillers with solubles | 18.233586 | 10 | 5.79771 |
| Wheat - ground 8-14% NDF | 0 | 40 | 20 |

Shrimp Ration

According to an exemplary embodiment, the pellet is a compound feed for shrimp, having a binder (e.g. vital wheat gluten, etc.) with the combination of ingredients as shown in TABLE I.

TABLE I

| Ingredient | (wt %) |
|---|---|
| Fishmeal | 20 |
| Soybean meal | 25 |
| Wheat flour | 20 |
| Wheat or rice bran | 10 |
| Animal by-products | 10 |
| Plant proteins | 6 |
| Lecithin | 2 |
| Oil | 3 |
| Vitamin and mineral premixes | 0.5 |
| Macro minerals, fillers, and binders | 3.5 |

Pellet Durability

The term "durability" of a pellet as used in this disclosure means the physical integrity of the finished pellet in handling and transport with minimum generation of fines and broken pellets. The term "PDI" as used in this disclosure means the percentage of pellets by weight that survive a standardized pellet durability test such as American Society of Agricultural Engineers Standards ASAE S269.3, which test is hereby incorporated by reference in its entirety. PDI may be measured using the Holman Pellet Tester commercially available from Holman Chemical Ltd. of United Kingdom (where the percentage of whole pellets remaining after testing indicates the durability), and the Spring Hardness Tester (Amandus Kahl GmbH & Co. KG, Hamburg, Germany) (where the pellet is submitted to increasing pressure until the pellet breaks thereby indicating the pellet hardness). PDI may also be measured according to the Kansas University test to predict the amount of fines produced by handling pellets before feeding time. This is accomplished using a specially designed pellet tumbler which duplicates the amount of breakage that normally occurs from the time the pellets are expelled until they are consumed by the animal. Each chamber measures 12" long×5½" wide×12" deep. The results of the tests are interpreted as standard measure of quality, which is referred to as the pellet durability index (PDI). The procedure for the Kansas University test using the pellet tumbler: secure a representative sample; remove broken pellets from sample with appropriate hand sieve; weigh out 500 grams of screened sample; tumble 500 grams of screened pellets for 10 minutes; re-screen and weigh whole pellet sample; compute PDI by dividing the weight of the whole pellets by 500 and multiplying by 100. According to an exemplary embodiment, the pellet has a PDI of less than about 100 (e.g. greater than 80, greater than 85, greater than 90, greater than 95, etc.) according to the pellet tumbler method.

Pellet Compression Test

The compression test is determined by placing a pellet between two steel plates and evenly applying pressure until fracture occurs. The value is measured in pounds of pressure applied. According to an exemplary embodiment, smaller pellets of 16-mesh size may have a compressive strength of 1.0 pounds, and larger pellets of 4-mesh size may have a compressive strength of at least 8 pounds to about 50 pounds. According to one embodiment, the pellet has a compressive strength of less than 50 pounds according to the pellet compression test method. According to a preferred embodiment, the pellet has a compressive strength of 4-6 pounds according to the pellet compression test method.

Pellet Hardness (Also Referred to as "Crush Strength")

The hardness of the pellet is determined by the following procedure: randomly select six pellets; place the pellets on a hard surface; using a Wagner FDK 20 force gage, compress the pellet until it breaks; record the reading on the force gage, repeat for all 6 samples. Subsequently calculate the average crush strength.

Pellet Impact Strength

The impact strength of the pellet represents its ability to survive multiple drops, e.g. conveyor-belt transfers. The pellet impact strength may be measured by the "drop test." According to the drop test, the impact strength of the pellet is determined by the repeated dropping of the pellet onto an iron surface from a height of 18 inches until the pellet fractures or chips. The strength is recorded in the average number of drops the pellet survived. According to an exemplary embodiment, the pellet has an impact strength of 10 drops. According to another example, the pellet has an impact strength of 50 drops.

Pellet Attrition

The attrition test is determined by placing 10-mesh pellets on a 12-mesh sieve and vibrating with a common sieve shaker for five minutes. The amount of material passing the 12-mesh screen is measured as the attrition loss percentage. According to an exemplary embodiment, the pellets have less than 5% attrition loss. According to another exemplary embodiment, the pellets have 2-3% attrition loss.

Pellet Bulk Density

The bulk density is the weight of material per cubic foot volume. Bulk density is measured with a scale and graduated cylinder (1000 ml sample). According to an exemplary embodiment, the pellets have a bulk density as shown in TABLE J. According to preferred embodiment, the pellets have a bulk density of less than about 70 pounds per cubic foot.

TABLE J

| FEED | PELLET DIAMETER | g/L | IBS/FT3 |
|---|---|---|---|
| Pork Starter | +0.250" | 460.0 | 28.7 |
| Pork Starter | +0.187" | 520.0 | 32.5 |
| Aqua Feed | +0.250" | 456.7 | 28.5 |
| Aqua Feed | +0.187" | 627.7 | 39.2 |
| Mineral Supplement | +0.250" | 1073.1 | 67.0 |
| Mineral Supplement | +0.187" | 1117.3 | 69.8 |

Pellet Moisture Content

Wet pellet samples are put in a moisture balance which measures starting "wet" weight, evaporates off moisture, and measures finished "dry" weight during a recorded time period. The % moisture is a "wet" weight=wt. of water evaporated/wt. of wet product. (Moisture Balance—Mettler Instrument Corp., New Jersey, model LP-16/PM480 delta range—320° F.—50 gram sample size). According to an exemplary embodiment, the pellets have a moisture content of 1%-12%. According to another exemplary embodiment, the pellets have 0%-1% moisture.

Pellet Water Stability

The pellet water stability may be measured according to the "pellet water stability test method." According to this test method, the dry matter content of a feed pellet is measured before and after soaking in water while being stirred. The duration of stability is variable (e.g. 1 hour, 12 hours, 1 day, etc.). The pellet stability is represented by the percent solids retained which is calculated from the testing data. According to the pellet water stability test method, twenty pellets are weighed and placed in a beaker containing 600 ml of water and a Teflon coated stir bar (Fisher Scientific, 1.25 inches, Catalog #14-511-94, or equivalent). The beaker is then placed on a stir plate (Fisher Scientific, for 120 volt, Catalog #14-493-120s, 6 inch diameter platform, or equivalent). The stir plate is turned on and set at stir speed 4 for a predetermined time period (e.g. 1 hour). After the time has expired, the sample is poured onto a screen that is one standard size below the starting diameter of the pellet. The pellets retained on the screen are dried for 2 hours at 135 degrees Celsius and weighed. The final weight of the pellet is used to calculate the percent solids retained after a predetermined time period.

A small sample of dry pellets is put in a container with water to determine their ability to break down and dissolve. According to an exemplary embodiment, pellets made with a water soluble binder such as molasses break down and dissolve after less than 1 hour. According to another exemplary embodiment, pellets made with a water stable binder such as vital wheat gluten do not break down and have water stability of greater than 3 hours, preferably, greater than 12 hours, e.g. do not dissolve after greater than 24 hours.

In representative embodiments of the invention is a method of making a feed pellet for an animal, where the method includes the steps of providing at least two ingredients to a first apparatus; agglomerating at least two ingredients in the first apparatus to form a plurality of nuclei; transferring the plurality of nuclei to a second apparatus that is separate from the first apparatus, tumbling the plurality of nuclei in the second apparatus and simultaneously providing additional amounts of the at least two ingredients to the second apparatus, thereby forming a plurality of feed pellets for an animal. In one instance of the embodiment, the mixing apparatus is selected from the group consisting of a pin mixer and a paddle mill and the growth agglomeration apparatus is selected from the group consisting of a disc pelletizer and a rotary drum agglomerator. In yet another instance of the present invention, the feed pellet is a mineral supplement that includes the following ingredients: a calcium nutrient provided by a calcium containing ingredient; an added salt nutrient provided by a salt containing ingredient; optionally a non-protein nitrogen nutrient provided by a nitrogen containing ingredient; optionally a trace mineral; optionally a vitamin; and optionally a binder. In this instance, providing includes providing to a mixing apparatus at least two of the ingredients; agglomerating includes agglomerating in the mixing apparatus the at least two ingredients, thereby forming a plurality of nuclei; tumbling includes tumbling in a growth agglomeration apparatus the plurality of nuclei and simultaneously providing additional amounts of the at least two ingredients, thereby, forming a plurality of pellets, wherein each of the pellets includes at least one of the nuclei and the at least two ingredients; wherein each of the pellets has a major diameter greater than a major diameter of the corresponding nuclei of the pallet; an wherein the at least two ingredients each comprises a material suitable for fulfilling at least some of the nutritional requirements of the In another representative embodiment of the present invention is a mineral feed pellet that includes a calcium nutrient provided by at least one calcium containing ingredient wherein the calcium containing ingredient is present in an amount in the range from 50 to 80 percent by weight of the feed pellet; and an added salt nutrient provided by at least one chloride salt containing ingredient, wherein the chloride salt containing ingredient is present in an amount in the range from 15 to 20 percent by weight of the feed pellet. In one instance of this embodiment, the mineral feed pellet further includes a binder. This binder may include a water soluble material, molasses and/or animal glue, or a water insoluble material. In a particular instance, the water insoluble material includes vital wheat gluten, In a further instance, the feed pellet consists of the at least one calcium containing ingredient, the at least one chloride salt containing ingredient, at least one binder, at least one vitamin, and at least one trace mineral.

In still another representative embodiment of the present invention, is a mineral feed pellet that includes a calcium nutrient provided by at least one calcium containing ingredient, wherein the calcium containing ingredient is present in an amount in the range from 40 to 80 percent by weight of the feed pellet; an added salt nutrient provided by at least one chloride salt containing ingredient, wherein the chloride salt containing ingredient is present in an amount in the range from 5 to 20 percent by weight of the feed pellet; and a non-protein nitrogen nutrient providing by a nitrogen containing ingredient wherein the nitrogen containing ingredient is present in an amount in the range from 1 to 40 percent by weight of the feed pellet. In one instance of this embodiment, the nitrogen containing ingredient comprises urea. In another instance, the mineral feed pellet also includes at least one binder. This binder may include a water soluble material, molasses and/or animal glue, or a water insoluble material. In a particular instance, the water insoluble material includes vital wheat gluten. In a further instance, the feed pellet consists of the at least one calcium containing ingredient the at least one chloride salt containing ingredient, at least one binder, at least one vitamin, and at least one trace mineral. In a particular instance of this embodiment, the feed pellet consists of the at least one calcium containing ingredient, the at least one chloride salt containing ingredient, the urea, at least one binder, at least one vitamin, and at least one trace mineral.

EXAMPLES

Aspects of certain methods in accordance with aspects of the invention are illustrated in the following EXAMPLES.

Example 1—Mineral Feed Supplement

A mineral feed supplement pellet was made. The following dry mix ingredients and a binder (molasses) were provided in the following amounts: calcium carbonate 66.90 wt %, salt 18.10 wt %, 15 wt % of a 50% Molasses:50% Water Binder was added ad libitum until pellets formed in a disc pelletizer to desired range of sizes. Additional amounts of the dry mix and binder were added to the pellets and were tumbled for approximately 1-2 minutes. The pan of the disc pelletizer was adjusted to an angle of 15-30 degrees as needed relative to horizontal. The pan of the disc pelletizer was rotated at a speed of 15-30 rpms. The resulting pellets were transported from the disc pelletizer to a dryer and dried at temperature of 100 degrees C. for a period of greater than 30 minutes. The resulting pellets were transported to a stack of USA Standard Screens (+5/16 inches (0.313 inches), +¼ inches (0.250 inches), +Number 4 screen (0.187 inches) all commercially available from VWR Scientific Corporation of Radnor, Pa., USA. The resulting pellets had the following properties as shown in TABLE 1.

TABLE 1

|  | Crush Strength (lbs) |
| --- | --- |
| EXAMPLE 1 | 12-26 |

Example 2—Mineral Feed Supplement

A mineral feed supplement pellet was made at FEECO International of Green Bay, Wis. using an 8 inch pin mixer and a 24 inch pan agglomerator. A base dry mix of ingredients and binder were supplied by Cargill to FEECO International. The formulations are in Table 2A (Dry Mix) and TABLE 2B (Binder).

TABLE 2A

|  | % |
| --- | --- |
| SALT | 9.35% |
| CALCIUM CARB (DUST) | 62.30% |
| TRACE MINERALS INCLUDING COPPER, ZINC, AND SELENIUM | 3.67% |

TABLE 2A-continued

| | % |
|---|---|
| UREA | 15.94% |
| POTASSIUM CH 50 | 7.65% |
| MAGNESIUM OXIDE, 56% | 1.09% |
| | 100.00% |

TABLE 2B

| | % |
|---|---|
| Urea | 50.00% |
| Water | 50.00% |
| | 100.00% |

Five Pounds of the base dry mix of ingredients were fed into an 8 inch pin mixer with 0.3 pounds of binder solution and mixed for 15 seconds, resulting in a uniformly blended de-dusted material discharged from the pin mixer. Part of the blended material was then fed to a 24 inch diameter pan pelletizer rotating at 17 rotations per minute at an angle of 50 degrees from horizontal. Additional binder solution was added onto the material as it rotated around the pan. Small 1.0 millimeter feed pellets formed and grew uniformly across the pan pelletizer as more blended feed material and binder solution was added to the pan agglomerator. At steady state, pellets around 4-6 millimeter in size discharged from the pan agglomerator. A total of an additional 0.8 lbs of binder solution was added to the blended material. The discharged pellets were then fed and held on a fluid bed drier for 30 minutes at an air temperature of 150 degrees Fahrenheit (65 degrees Celsius). The pellets were then cooled by blowing ambient air through them for 5 minutes.

The resulting pellets had the following properties as shown in TABLE 2C.

TABLE 2C

| | Compression Test (pounds) |
|---|---|
| 6 Mesh Pellets | 2.0-3.5 |
| −5/16" to +¼" Pellets | 5.0-7.0 |

Example 3A Through 3C—Evaluation of Particle Size and Binders

Various calcium carbonate pellets were pan agglomerated to form pellets. In these trials, no pin mixer was used to precondition the meal (i.e. dry mix). A 12 inch diameter pan agglomerator was fed a dry base mix while a binder was sprayed ad libitum on to the feed (dry mix) to form pellets. The pellets were dried at 105 degrees Celsius overnight (~16 hours) in forced air drying oven. The pellets were then allowed to cool to ambient air temperature. The base dry mix of ingredients was made according to the following formulations as shown in TABLE 3A.

TABLE 3A

| | 3A (wt %) | 3B (wt %) | 3C (wt %) |
|---|---|---|---|
| Coarse Calcium Carbonate Unscreened | 97.00 | 97.00 | |
| Fine Calcium Carbonate Screened with a US #50 Standard Sieve | | | 97.00 |
| Cargill MaltoDextrin 1956 | | 3.00 | |
| Cargill Dry GL Corn Syrup Solids | 3.00 | | 3.00 |
| Total (wt %) | 100.00 | 100.00 | 100.00 |

The binder used in EXAMPLES 3A through 3C is shown in TABLE 3B.

TABLE 3B

| | 3A (wt %) | 3B (wt %) | 3C (wt %) |
|---|---|---|---|
| Water | AD LIBITUM | AD LIBITUM | AD LIBITUM |

The resulting pellets had the following properties as shown in TABLE 3C.

TABLE 3C

| | Percent Pellets Retained on Standard Screens | |
|---|---|---|
| 3A (wt %) | >¼" (6.4 mm) | 11.1 |
| | >#7 (2.8 mm) | 31.2 |
| | >#8 (2.4 mm) | 16.1 |
| | Pan | 41.6 |
| 3B (wt %) | >¼" (6.4 mm) | 10.9 |
| | >#7 (2.8 mm) | 29.9 |
| | >#8 (2.4 mm) | 25.5 |
| | Pan | 33.7 |
| 3B (wt %) | >¼" (6.4 mm) | 45.4 |
| | >#7 (2.8 mm) | 21.9 |
| | >#8 (2.4 mm) | 3.4 |
| | Pan | 29.4 |

Example 4—Low Urea Pellets with a Urea Solution Binder

Various pellets were made according to the process and using the same equipment as recited in EXAMPLES 3A through 3C. Two modifications were made to the drying process: 1) oven temperature was reduced to 100 degrees Celsius; and 2) a sub sample of the largest pellets were air dried overnight versus oven drying. A base dry mix of ingredients was made according to the following formulation as shown in TABLE 4A.

TABLE 4A

| | 4A (wt %) |
|---|---|
| Fine Calcium Carbonate Screened with a US #50 Standard Sieve | 97.00 |
| Urea | 3.00 |
| Total (wt %) | 100.00 |

The approximate amount of binder used in EXAMPLE 4A is shown in TABLE 4B.

TABLE 4B

|  | 4A (wt %) |
|---|---|
| Binder (50% Urea) | 10-15% |

The resulting pellets had the following properties as shown in TABLE 4C.

TABLE 4C

| | | | Hardness (lbs crush strength) | | | | |
|---|---|---|---|---|---|---|---|
| | | Pellet | Hardness | | | | |
| | | Diameter | Rep 1 | Rep 2 | Rep 3 | Rep 4 | Average |
| 4A OVEN DRIED (wt %) | Oven Dried (100 C.) | >3/8" | 6.50 | 10.50 | 9.00 | 12.00 | 9.50 |
| | | >5/16" | 8.00 | 4.00 | 6.50 | 5.25 | 5.94 |
| | | >1/4" | 2.25 | 3.50 | 3.00 | 6.00 | 3.69 |
| | | Pellet | Hardness | | | | |
| | | Diame | Rep 1 | Rep 2 | Rep 3 | Rep 4 | Average |
| 4A AIR DRIED (wt %) | Air Dried | >3/8" | <1.0 | <1.0 | <1.0 | <1.0 | <1.0 |

Example 5—Calcium Pellets with a 30% Carmil Glo Binder

Various calcium pellets were made according to the process and using the equipment as recited in EXAMPLES 3A through 3C. A base dry mix of ingredients was made according to the following formulations as shown in TABLE 5A.

TABLE 5A

|  | 5A (wt %) |
|---|---|
| Calcium Carbonate Screened with a US #50 Standard Sieve | 100.00 |
| Total (wt %) | 100.00 |

The binder used in EXAMPLE 5 is shown in TABLE 5B.

TABLE 5B

|  | 5A (wt %) |
|---|---|
| Binder (30% Carmil Glo) | AD LIBITUM |

The resulting pellets had the following properties as shown in TABLE 5C.

TABLE 5C

| SCREEN | >3/8" | >5/16" | >1/4" | >#4 | <#4 |
|---|---|---|---|---|---|
| Yield (%) | 18.4 | 48.7 | 24.4 | 5.5 | 3.0 |
| PDI | 20.8 | 25.0 | 24.7 | NA | NA |
| Avg Crush Strength (n = 4) | 6 | 4 | 4 | 2 | NA |

Examples 6A Through 6D—Comparison of Different Calcium Carbonate Sources and Sizes Various calcium carbonate pellets were made according to the process and using the equipment as recited in EXAMPLES 3A through 3C. This experiment was repeated with two different lab technicians. A base dry mix of ingredients was made according to the following formulations as shown in Table 6A.

TABLE 6A

|  | 6A (wt %) | 6B (wt %) | 6C (wt %) | 6D (wt %) |
|---|---|---|---|---|
| Calcium Carbonate Screened with a US #50 Standard Sieve | 100.00 | | | |
| UNICAL P | | 100.00 | | |
| UNICAL UF | | | 100.00 | |
| UNICAL C | | | | 100.00 |
| Total (wt %) | 100.00 | 100.00 | 100.00 | 100.00 |

The binder used in EXAMPLES 6A through 6D are shown in TABLE 6B.

TABLE 6B

|  | 6A (wt %) | 6B (wt %) | 6C (wt %) | 6D (wt %) |
|---|---|---|---|---|
| Binder (50% Molasses) | AD LIBITUM | AD LIBITUM | AD LIBITUM | AD LIBITUM |

The resulting pellets for each technician had the following properties as shown in TABLE 6C.

TABLE 6C

| | 18" drop test | ~1/4" Pellet | | | | | | | |
|---|---|---|---|---|---|---|---|---|---|
| | | Technician 1 | | | | | Technician 2 | | |
| Green Strength | 1 | 2 | 3 | 4 | Avg | 1 | 2 | 3 | 4 | Avg |
| Calcium Carbonate Screened with US #50 Standard Sieve | 5 | 5 | 6 | ND | 5 | 3 | 3 | 4 | 4 | 4 |
| Unical P | 4 | 5 | 6 | ND | 5 | 3 | 3 | 3 | 3 | 3 |

TABLE 6C-continued

| | | | | | | | | | | |
|---|---|---|---|---|---|---|---|---|---|---|
| Unical UF | 10 | 6 | 11 | 9 | 9 | 13 | 20 | 17 | 10 | 15 |
| Unical C | 6 | 6 | 6 | 6 | 6 | 5 | 6 | 5 | 5 | 5 |

| | 20# PSI Gage | | | | ~¼" Pellet | | | | | |
|---|---|---|---|---|---|---|---|---|---|---|
| | Technician 1 | | | | | Technician 2 | | | | |
| Crush Strength | 1 | 2 | 3 | 4 | Avg | 1 | 2 | 3 | 4 | Avg |
| Calcium Carbonate Screened with US #50 Standard Sieve | 22.75 | 19 | 28 | 21 | 23 | 17.5 | 16.25 | 21.5 | 19.5 | 19 |
| Unical P | 36 | 41 | 37 | 33.5 | 37 | 26 | 38 | 37 | 31 | 33 |
| Unical UF | 28 | 39 | 30 | 36 | 33 | 24.5 | 19 | 30 | 17 | 23 |
| Unical C | 25 | 30 | 27 | 24.5 | 27 | 40 | 34 | 21 | 46.5 | 35 |

Examples 7A and 7B—Comparison of Different Calcium Carbonate Particle Sizes

Various calcium carbonate pellets were made according to the process and using the equipment as recited in EXAMPLES 3A through 3C. A base dry mix of ingredients was made according to the following formulations as shown in Table 7A.

TABLE 7A

| | 7A (wt %) | 7B (wt %) |
|---|---|---|
| Calcium Carbonate Screened with a US #50 Standard Sieve | 100.00 | |
| Calcium Carbonate Unscreened | | 100.00 |
| Total (wt %) | 100.00 | 100.00 |

The binder used in EXAMPLES 7A through 7B are shown in TABLE 7B.

TABLE 7B

| | 7A (wt %) | 7B (wt %) |
|---|---|---|
| Binder (50% Molasses) | AD LIBITUM | AD LIBITUM |

The resulting pellets had the following properties as shown in TABLE 7C.

TABLE 7C

| SIZE DISTRIBUTION | | |
|---|---|---|
| SCREEN SIZE | 7A | 7B |
| +5/16 (0.313) | 20.1% | 0.5% |
| +¼ (0.250) | 21.4% | 2.5% |
| +(0.187) | 31.8% | 11.0% |
| +#6 (0.132) | 17.9% | 20.4% |
| −#6 (0.132) | 2.4% | 64.8% |
| −#50 (0.012) | 6.4% | 0.8% |
| HARDNESS CRUSH STRENGTH (POUNDS) | | |
| PELLET SIZE ~+0.187 | 7A | 7B |
| Rep 1 | 16.50 | 17.00 |
| Rep 2 | 8.25 | 12.75 |
| Rep 3 | 17.00 | 13.25 |

TABLE 7C-continued

| | | |
|---|---|---|
| Rep 4 | 13.00 | 12.00 |
| Rep 5 | 12.00 | 15.50 |
| Rep 6 | 9.25 | 15.50 |

Example 8A Through 8E—Compare Different Ratios of Molasses as a Binder

A mineral feed supplement was pelleted according to the process and using the equipment as recited in EXAMPLES 3A through 3C. A base dry mix of ingredients was made according to the following formulations as shown in Table 8A.

TABLE 8A

| Base Mix | % |
|---|---|
| SALT | 12.18% |
| CALCIUM CARB DUST | 83.93% |
| TRACE MINERALS INCLUDING COPPER, ZINC AND SELENIUM | 3.90% |
| | 100.00% |

The binder used in EXAMPLES 8A through 8E are shown in TABLE 8B.

TABLE 8B

| Treatment | 8A | 8B | 8C | 8D | 8E |
|---|---|---|---|---|---|
| EXAMPLE 8 Base Mix (g) | 500.0 | 500.0 | 500.0 | 500.0 | 500.0 |
| 50:50 Molasses:Water | AD LIB | | | | |
| 45:55 Molasses:Water | | AD LIB | | | |
| 40:60 Molasses:Water | | | AD LIB | | |
| 35:65 Molasses:Water | | | | AD LIB | |
| 30:70 Molasses:Water | | | | | AD LIB |

The resulting pellets had the following properties as shown in TABLE 8C.

TABLE 8C

| | | | | | TRT-A [327]-1 | | TRT-B [327]-2 | | TRT-C [327]-3 | | TRT-D [327]-4 | | TRT-E [327]-5 | |
|---|---|---|---|---|---|---|---|---|---|---|---|---|---|---|
| | | | | | REP A | REP B | REP A | REP B | REP A | REP B | REP A | REP B | REP A | REP B |
| | | | Binder Dilution | | 50:50 | 50.50 | 45:55 | 45:55 | 40:60 | 40:60 | 35:65 | 35:65 | 30:70 | 30:70 |
| | | | Added Binder (g) | | 97.60 | 85.78 | 88.78 | 94.09 | 83.29 | 91.7 | 88.52 | nd | 88.80 | nd |
| | | | Pellet Moisture (%) | | 11.53% | 10.98% | 11.85% | 12.15% | 11.28% | 12.17% | 12.01% | 11.74% | 13.04% | 11.79% |
| | Green Strength (#drops) | (−)5/16-(+)1/4 | | 1 | 38 | 17 | 7 | 20 | 5 | 20 | 2 | 5 | 15 | 9 |
| | | | | 2 | 29 | 16 | 20 | 29 | 5 | 29 | 4 | 12 | 19 | 9 |
| | | | | 3 | 38 | 28 | 17 | 20 | 5 | 20 | 3 | 8 | 17 | 9 |
| | | | | AVG | 35 | 20 | 15 | 23 | 5 | 23 | 3 | 8 | 17 | 9 |
| | | (−)1/4-(+)0.187 | | 1 | 38 | 8 | 24 | 25 | 2 | 19 | 3 | 6 | 5 | 13 |
| | | | | 2 | 40 | 10 | 11 | 17 | 4 | 6 | 2 | 4 | 2 | 7 |
| | | | | 3 | 40 | 20 | 11 | 14 | 8 | 14 | 15 | 6 | 12 | 8 |
| | | | | AVG | 39 | 13 | 15 | 19 | 5 | 13 | 7 | 5 | 6 | 9 |
| Crush Strength (HOT PELLETS) | Pellet Diameter | 0.25 | | 1 | 15.50 | 11.25 | 11.75 | 9.75 | 4.25 | 10.50 | 3.00 | 5.25 | 5.00 | 5.50 |
| | | | | 2 | 12.75 | 8.00 | 14.00 | 4.75 | 5.50 | 5.75 | 4.50 | 6.00 | 4.50 | 2.75 |
| | | | | 3 | 14.00 | 9.50 | 18.25 | 7.00 | 5.00 | 6.50 | 4.00 | 4.50 | 2.75 | 3.75 |
| | | | | 4 | 13.25 | 7.25 | 10.75 | 12.50 | 7.75 | 7.00 | 3.50 | 4.50 | 5.00 | 5.75 |
| | | | | 5 | 18.00 | 9.00 | 9.25 | 4.50 | 3.50 | 5.00 | 3.00 | 7.00 | 2.75 | 3.75 |
| | | | | 6 | 12.25 | 10.25 | 13.25 | 9.00 | 4.50 | 7.00 | 2.00 | 4.25 | 2.75 | 4.50 |
| | | | | AVG | 14.29 | 9.21 | 12.88 | 7.92 | 5.08 | 6.96 | 3.33 | 5.25 | 3.79 | 4.33 |
| | | 0.187 | | 1 | 9.50 | 6.00 | 9.25 | 8.25 | 3.75 | 6.00 | 2.00 | 2.50 | 3.25 | 3.75 |
| | | | | 2 | 8.25 | 4.25 | 4.25 | 4.50 | 5.75 | 3.00 | 3.25 | 2.25 | 2.50 | 5.25 |
| | | | | 3 | 10.75 | 5.25 | 5.25 | 5.25 | 3.50 | 3.00 | 2.50 | 2.25 | 3.00 | 3.50 |
| | | | | 4 | 9.25 | 7.00 | 6.25 | 4.50 | 4.75 | 5.25 | 3.00 | 2.00 | 2.50 | 3.00 |
| | | | | 5 | 8.00 | 8.50 | 8.25 | 4.00 | 3.50 | 5.50 | 3.00 | 3.50 | 2.50 | 3.50 |
| | | | | 6 | 9.25 | 5.25 | 7.75 | 4.50 | 7.00 | 3.25 | 5.00 | 2.25 | 3.25 | 3.50 |
| | | | | AVG | 9.17 | 6.04 | 6.83 | 5.17 | 4.71 | 4.33 | 3.13 | 2.46 | 2.83 | 3.75 |
| Crush Strength (Ambient Pellets) | Pellet Diameter | 0.25 | | 1 | 8.25 | NA | NA | NA | NA | NA | NA | NA | NA | NA |
| | | | | 2 | 7 | NA | NA | NA | NA | NA | NA | NA | NA | NA |
| | | | | 3 | 4 | NA | NA | NA | NA | NA | NA | NA | NA | NA |
| | | | | 4 | 4.5 | NA | NA | NA | NA | NA | NA | NA | NA | NA |
| | | | | 5 | 3.5 | NA | NA | NA | NA | NA | NA | NA | NA | NA |
| | | | | 6 | 6.75 | NA | NA | NA | NA | NA | NA | NA | NA | NA |
| | | | | AVG | 5.67 | NA | NA | NA | NA | NA | NA | NA | NA | NA |
| | | 0.187 | | 1 | 4.25 | NA | NA | NA | NA | NA | NA | NA | NA | NA |
| | | | | 2 | 3 | NA | NA | NA | NA | NA | NA | NA | NA | NA |
| | | | | 3 | 3.5 | NA | NA | NA | NA | NA | NA | NA | NA | NA |
| | | | | 4 | 3.75 | NA | NA | NA | NA | NA | NA | NA | NA | NA |
| | | | | 5 | 2.75 | NA | NA | NA | NA | NA | NA | NA | NA | NA |
| | | | | 6 | 3.25 | NA | NA | NA | NA | NA | NA | NA | NA | NA |
| | | | | AVG | 3.42 | NA | NA | NA | NA | NA | NA | NA | NA | NA |
| | | Inches | mm | | | | | | | | | | | |
| size distribution (%) | Pellet Diameter | 0.375 | 9.51 | | 43.91 | 1.39 | 16.65 | 0.20 | 0.20 | 0.35 | 0.67 | 1.01 | 0.28 | 4.19 |
| | | 0.313 | 8.00 | | 21.32 | 0.94 | 20.33 | 0.66 | 0.44 | 0.50 | 0.40 | 2.75 | 0.17 | 8.83 |
| | | 0.250 | 6.30 | | 18.10 | 3.15 | 21.43 | 3.68 | 0.65 | 2.05 | 2.99 | 7.57 | 1.03 | 21.31 |
| | | 0.187 | 4.76 | | 10.13 | 17.11 | 20.24 | 15.60 | 7.98 | 22.50 | 10.26 | 15.23 | 4.09 | 30.71 |
| | | 0.132 | 3.35 | | 4.82 | 33.89 | 16.15 | 43.42 | 30.96 | 44.01 | 22.23 | 23.29 | 27.61 | 23.43 |
| | | 0.111 | 2.80 | | 0.65 | 12.30 | 2.52 | 13.89 | 13.76 | 10.45 | 11.32 | 9.95 | 12.54 | 5.43 |

Examples 9A and 9B—Compares if Premixing a Mineral Base Mix Effects Pelleting or Pellet Quality A mineral feed supplement EXAMPLE 9A was pelleted according to the process and using the equipment as recited in EXAMPLES 3A through 3C. EXAMPLE 9B added a step of premixing the binder in a simulated pin mixer to produce a preconditioned feed that was then pelleted according to the process and using the equipment in as recited in EXAMPLE 3A through 3C. A base dry mix of ingredients was made according to the following formulations as shown in Table 9A.

TABLE 9A

| Base Mix | % |
|---|---|
| SALT | 12.18% |
| CALCIUM CARB | 83.93% |
| TRACE MINERALS INCLUDING COPPER, ZINC AND SELENIUM | 3.90% |
| | 100.00% |

The binder used in EXAMPLES 9A and 9B are shown in TABLE 9B.

TABLE 9B

| Treatment | 9A | 9B |
|---|---|---|
| EXAMPLE 9 Base Mix (g) | 450.0 | 450.0 |
| 50:50 Molasses:Water (g) (premixed in simulated pin mixer) | | 50.0 |
| 50:50 Molasses:Water (g) | AD LIB | AD LIB |

The resulting pellets had the following properties as shown in TABLE 9C.

TABLE 9C

|  |  |  | 9A | | | 9B | | |
| --- | --- | --- | --- | --- | --- | --- | --- | --- |
|  |  |  | REP A | REP B | REP C | REP A | REP B | REP C |
|  |  | Binder Dilution | 50:50 | 50:50 | 50:50 | 50:50 | 50:50 | 50:50 |
|  | Simulated "PIN" Mixer Speed |  | NA | NA | NA | Setting 4 | Setting 4 | Setting 4 |
| Green Strength (#drops) | (−)⁵⁄₁₆-(+)¼ | 1 | 16 | 2 | 30 | 16 | 30 | 30 |
|  |  | 2 | 3 | 3 | 30 | 30 | 30 | 30 |
|  |  | 3 | 7 | 3 | 30 | 30 | 30 | 30 |
|  |  | AVG | 9 | 3 | 30 | 25 | 30 | 30 |
|  | (−)¼-(+)0.187 | 1 | 9 | 3 | 30 | 30 | 30 | 30 |
|  |  | 2 | 13 | 5 | 30 | 13 | 30 | 30 |
|  |  | 3 | 27 | 1 | 30 | 30 | 30 | 30 |
|  |  | AVG | 16 | 3 | 30 | 24 | 30 | 30 |
|  | Pellet Moisture (%) |  | 11.05% | 10.47% | 11.68% | 14.05% | 11.64% | 11.41% |
| Size Distribution (%) | 0.375 | 9.51 | 0.68% | 0.32% | 54.22% | 8.29% | 1.83% | 9.27% |
|  | 0.313 | 8.00 | 10.83% | 1.01% | 21.04% | 10.39% | 0.93% | 12.68% |
|  | 0.250 | 6.30 | 27.84% | 4.48% | 15.74% | 11.10% | 3.54% | 18.89% |
|  | 0.187 | 4.76 | 33.91% | 12.99% | 6.93% | 11.89% | 15.65% | 16.62% |
|  | 0.132 | 3.35 | 18.62% | 29.12% | 1.60% | 19.17% | 36.90% | 15.96% |
|  | 0.111 | 2.80 | 3.24% | 13.44% | 0.16% | 8.81% | 14.20% | 6.60% |
|  |  | Pan | 4.88% | 38.64% | 0.30% | 30.35% | 26.96% | 19.99% |
|  |  | REP |  |  |  |  |  |  |
| Pellet Diameter (inches) | 0.25 | 1 | 15.50 | 9.25 | 8.50 | 15.50 | 15.00 | 15.50 |
|  |  | 2 | 9.50 | 11.50 | 15.50 | 18.25 | 14.25 | 20.75 |
|  |  | 3 | 7.50 | 8.25 | 19.75 | 19.00 | 15.75 | 17.00 |
|  |  | 4 | 12.00 | 9.50 | 16.50 | 19.50 | 14.75 | 21.00 |
|  |  | 5 | 7.25 | 8.25 | 19.25 | 20.50 | 13.25 | 20.00 |
|  |  | 6 | 9.50 | 7.25 | 16.75 | 18.25 | 13.75 | 21.00 |
|  |  | AVG | 10.21 | 9.00 | 16.04 | 18.50 | 14.46 | 19.21 |
|  |  | REP |  |  |  |  |  |  |
|  | 0.187 | 1 | 12.50 | 7.25 | 15.75 | 14.00 | 13.75 | 18.50 |
|  |  | 2 | 7.75 | 7.25 | 10.50 | 13.00 | 7.75 | 11.25 |
|  |  | 3 | 8.50 | 10.00 | 15.75 | 9.00 | 10.50 | 15.50 |
|  |  | 4 | 12.25 | 6.00 | 13.25 | 10.50 | 16.25 | 15.50 |
|  |  | 5 | 8.75 | 7.75 | 11.00 | 10.50 | 9.75 | 17.00 |
|  |  | 6 | 7.50 | 5.50 | 16.50 | 7.50 | 8.75 | 15.00 |
|  |  | AVG | 9.54 | 7.29 | 13.79 | 10.75 | 11.13 | 15.46 |

Examples 10A Through 10C—Compares the Effects of Different Drying Temperatures on Pellet Quality A mineral feed supplement was pelleted according to the process and using the equipment as recited in EXAMPLE 9B. A base dry mix of ingredients was made according to the following formulations as shown in Table 10A. Three separate batches were made and divided into 2 equal parts. Part 1, EXAMPLE 10A's were dried at 60 degrees Celsius using a bench top fluid bed drier for 30 minutes. Part 2, EXAMPLE 10B's were dried at 80 degrees Celsius using a bench top fluid bed drier for 30 minutes.

TABLE 10A

| Base Mix | % |
| --- | --- |
| UREA | 23.34% |
| SALT | 9.15% |
| CALCIUM CARB (DUST) | 55.35% |

TABLE 10A-continued

| Base Mix | % |
| --- | --- |
| POTASSIUM CH 50 | 7.49% |
| MAGNESIUM OXIDE, 56% | 1.06% |
| TRACE MINERALS INCLUDING COPPER, ZINC AND SELENIUM | 3.60% |
|  | 100.00% |

The binder used in EXAMPLES 10A through 10C are shown in TABLE 10B.

TABLE 10B

|  | Batch 1 | Batch 2 | Batch 3 |
| --- | --- | --- | --- |
| Base Mix (g) | 450 | 450 | 450 |
| 50:50 Urea:Water (by wt)(g) Added to simulated Pin Mixer | 30 | 30 | 30 |
| 50:50 Urea:Water (by wt)(g) | Ad Libitum | Ad Libitum | Ad Libitum |

The resulting pellets had the following properties as shown in TABLE 10C.

TABLE 10C

|  |  | Batch 1 | | Batch 2 | | Batch 3 | |
| --- | --- | --- | --- | --- | --- | --- | --- |
|  |  | 10A | 10B | 10A | 10B | 10A | 10B |
| Dryer | start | 60.0 | 80.0 | 60.0 | 80.0 | 60.0 | 80.0 |
| Temp | end | 65.8 | 82.4 | 65.1 | 82.1 | 65.9 | 82.4 |
|  | Minutes | g Loss | g Loss | g Loss | g Loss | g Loss | g Loss |
| Moisture | 0 | 0.00 | 0.00 | 0.00 | 0.00 | 0.00 | 0.00 |
| Loss (g) | 5 | 5.77 | 6.84 | 5.39 | 9.19 | 5.40 | 7.38 |
|  | 10 | 8.90 | 9.53 | 8.22 | 12.00 | 8.12 | 10.33 |
|  | 15 | 10.62 | 10.85 | 10.54 | 13.33 | 10.44 | 11.82 |
|  | 20 | 11.68 | 11.58 | 11.38 | 14.68 | 11.39 | 12.71 |
|  | 25 | 12.35 | 12.16 | 12.15 | 15.15 | 12.15 | 13.32 |
|  | 30 | 13.88 | 12.40 | 12.69 | 15.97 | 12.67 | 13.75 |

|  | rep | batch 1 | | batch 2 | | batch 3 | |
| --- | --- | --- | --- | --- | --- | --- | --- |
| green | 1 | 3 | | 4 | | 9 | |
| strength | 2 | 2 | | 9 | | 5 | |
| (# drops) | 3 | 5 | | 3 | | 7 | |
|  | Average | 3.3 | | 5.3 | | 7.0 | |

|  | rep | 10A | 10B | 10A | 10B | 10A | 10B |
| --- | --- | --- | --- | --- | --- | --- | --- |
| Hardness | 1 | 8.50 | 17.00 | 4.75 | 13.00 | 5.00 | 13.50 |
| ¼" | 2 | 6.00 | 11.00 | 5.25 | 8.75 | 4.25 | 8.00 |
| Pellets | 3 | 7.25 | 9.00 | 5.50 | 6.25 | 4.50 | 16.50 |
| (lbs) | 4 | 7.50 | 11.50 | 7.75 | 14.50 | 6.50 | 15.50 |
|  | 5 | 8.25 | 12.75 | 4.95 | 11.75 | 5.25 | 12.00 |
|  | 6 | 5.50 | 13.25 | 6.00 | 9.75 | 4.50 | 15.50 |
|  | Average | 7.17 | 12.42 | 5.70 | 10.67 | 5.00 | 13.50 |

Examples 11A and 11B—Compares the Effects of Different Drying Methods at the Same Temperature has on Pellet Quality A mineral feed supplement was pelleted according to the process and using the equipment as recited in EXAMPLE 9B. A base dry mix of ingredients was made according to the following formulations as shown in Table 11A. Two separate batches were made and divided into 2 equal parts. Part 1, EXAMPLE 11A's were dried at 80 degrees Celsius using a bench top fluid bed drier for 30 minutes. Part 2, EXAMPLE 11B's were dried at 80 degrees Celsius in a standard forced air drying oven for 30 minutes.

TABLE 11A

| Base Mix | % |
| --- | --- |
| UREA | 23.34% |
| SALT | 9.15% |
| CALCIUM CARB (DUST) | 55.35% |
| POTASSIUM CH 50 | 7.49% |
| MAGNESIUM OXIDE, 56% | 1.06% |
| TRACE MINERALS INCLUDING COPPER, ZINC AND SELENIUM | 3.60% |
|  | 100.00% |

The binder used in EXAMPLES 11A and 11B are shown in TABLE 11B.

TABLE 11B

|  | Batch 1 | Batch 2 |
| --- | --- | --- |
| Base Mix (g) | 450 | 450 |
| 50:50 Urea:Water (by wt)(g) Added to simulated Pin Mixer | 30 | 30 |
| 50:50 Urea:Water (by wt)(g) | Ad Libitum | Ad Libitum |

The resulting pellets had the following properties as shown in TABLE 11C.

TABLE 11C

|  |  | BATCH 1 | | BATCH 2 | |
| --- | --- | --- | --- | --- | --- |
| Total Binder Added (%) | | 12.56 | | 12.27 | |
|  | rep | BATCH 1 | | BATCH 2 | |
| green | 1 | 3 | | 2 | |
| strength | 2 | 3 | | 2 | |
| (# drops) | 3 | 2 | | 1 | |
|  | Average | 2.7 | | 1.7 | |

|  |  | 11A | 11B | 11A | 11B |
| --- | --- | --- | --- | --- | --- |
| Dryer | start | 80.0 | 80.0 | 80.0 | 80.0 |
| Temp | end | 82.2 | 80.0 | 82 | 80.0 |
|  | Minutes | g Loss | g Loss | g Loss | g Loss |
| Moisture | 5 | 2.53 | 0.48 | 8.57 | 0.35 |
| Loss (g) | 10 | 7.13 | 0.99 | 11.42 | 0.86 |
|  | 15 | 8.45 | 1.49 | 12.56 | 1.44 |
|  | 20 | 9.50 | 2.03 | 13.18 | 1.99 |
|  | 25 | 10.03 | 2.55 | 13.52 | 2.54 |
|  | 30 | 10.41 | 3.10 | 13.77 | 3.08 |

TABLE 11C-continued

| rep | 11A | 11B | 11A | 11B |
|---|---|---|---|---|
| Hardness 1 | 9.50 | 3.50 | 10.00 | 4.50 |
| ¼" 2 | 9.75 | 4.25 | 13.00 | 4.75 |
| Pellet 3 | 12.50 | 4.00 | 20.00 | 7.75 |
| Crush 4 | 14.75 | 3.75 | 10.25 | 4.00 |
| Strength 5 | 11.25 | 4.25 | 9.00 | 4.25 |
| (Pounds) 6 | 13.50 | 3.25 | 14.50 | 3.75 |
| Average | 11.88 | 3.83 | 12.79 | 4.83 |

Examples 12A Through 12E—Comparison of Different Binders on High Urea Formulas

A mineral feed supplement was pelleted according to the process and using the equipment as recited in EXAMPLES 9B. A base dry mix of ingredients was made according to the following formulations as shown in Table 12A. Samples were dried at 80 degrees Celsius using a bench top fluid bed drier for 15 minutes.

TABLE 12A

| Base Mix | % |
|---|---|
| UREA | 23.34% |
| SALT | 9.15% |
| CALCIUM CARB (DUST) | 55.35% |
| POTASSIUM CH 50 | 7.49% |
| MAGNESIUM OXIDE, 56% | 1.06% |
| TRACE MINERALS INCLUDING COPPER, ZINC AND SELENIUM | 3.60% |
| | 100.00% |

The binder used in EXAMPLES 12A through 12E are shown in TABLE 12B.

TABLE 12B

| | | 12A % | 12B % | 12C % | 12D % | 12E % |
|---|---|---|---|---|---|---|
| EXAMPLE 12 Base Mix | | 93.75 | 93.75 | 93.75 | 93.75 | 93.75 |
| 50:50 Molasses:Water (by wt.) | Added in simulated pin mixer | 6.25 | | | | |
| | Added in Pan Agglomerator | Ad Libitum | | | | |
| 60:40 Molasses:Water (by wt.) | Added in simulated pin mixer | | 6.25 | | | |
| | Added in Pan Agglomerator | | Ad Libitum | | | |
| 50:50 NORLIG A:Water (by wt.) | Added in simulated pin mixer | | | 6.25 | | |
| | Added in Pan Agglomerator | | | Ad Libitum | | |
| 60:40 NORLIG A:Water (by wt.) | Added in simulated pin mixer | | | | 6.25 | |
| | Added in Pan Agglomerator | | | | Ad Libitum | |
| 50:50 Urea:Water (by wt.) | Added in simulated pin mixer | | | | | 6.25 |
| | Added in Pan Agglomerator | | | | | Ad Libitum |

The resulting pellets had the following properties as shown in TABLE 12C.

TABLE 12C

| | | | | | MOLASSES | | | NORLIG A | | | UREA | |
|---|---|---|---|---|---|---|---|---|---|---|---|---|
| | | | | | 12A | | 12B | | 12C | | 12D | | 12E |
| | | | | | REP A | REP B | REP A | REP B | REP A | REP B | REP A | REP B | REP A | REP B |
| | Simulated Pin Mixer Binder (g) | | | | 30.00 | 30.00 | 30.00 | NA | 30.00 | NA | 30.00 | NA | 30.00 | 30.00 |
| | Total Binder (g) | | | | 50.96 | NA | 44.72 | NA | 51.26 | NA | 47.42 | NA | 57.61 | NA |
| | | | | REP | | | | | | | | | | |
| Green Strength (#drops) | Pellet Diameter (inches) | (−)5/16-(+)¼ | 1 | | 30 | 13 | 30 | NA | 15 | NA | 30 | NA | 2 | 5 |
| | | | 2 | | 30 | 30 | 30 | NA | 30 | NA | 28 | NA | 22 | 30 |
| | | | 3 | | 30 | 30 | 30 | NA | 16 | NA | 8 | NA | 1 | 12 |
| | | | AVG | | 30 | 24 | 30 | NA | 20 | NA | 22 | NA | 8 | 16 |
| | | | REP | | | | | | | | | | | |
| | | (−)¼-(+)0.187 | 1 | | 30 | 30 | 30 | NA | 30 | NA | 14 | NA | 2 | 4 |
| | | | 2 | | 30 | 11 | 30 | NA | 30 | NA | 5 | NA | 5 | 5 |
| | | | 3 | | 30 | 30 | 30 | NA | 30 | NA | 30 | NA | 3 | 10 |
| | | | AVG | | 30 | 24 | 30 | NA | 30 | NA | 16 | NA | 3 | 6 |
| Pellet Size Distribution (%) | Pellet Diameter (inches) | 0.375 | | | 9.51 | 31.55 | 4.13 | 43.78 | NA | NA | NA | NA | 7.79 | 6.43 |
| | | 0.313 | | | 8.00 | 14.76 | 5.32 | 8.48 | NA | NA | NA | NA | 5.85 | 8.08 |
| | | 0.250 | | | 6.30 | 12.77 | 8.35 | 7.54 | NA | NA | NA | NA | 10.93 | 14.78 |
| | | 0.187 | | | 4.76 | 11.70 | 14.57 | 10.45 | NA | NA | NA | NA | 18.23 | 28.22 |
| | | 0.132 | | | 3.35 | 16.03 | 27.69 | 16.44 | NA | NA | NA | NA | 28.26 | 27.81 |
| | | 0.111 | | | 2.80 | 5.14 | 14.83 | 5.46 | NA | NA | NA | NA | 10.00 | 6.60 |
| | | PAN | | | 8.06 | 25.11 | 7.85 | NA | NA | NA | NA | NA | 18.94 | 8.08 |
| | | | REP | | | | | | | | | | | |
| Crush Strength Hot Pellet (Pounds) | Pellet Diameter (inches) | 0.25 | 1 | | 6.25 | NA | NA | NA | 14.75 | NA | 9.50 | NA | 12.00 | 10.75 |
| | | | 2 | | 6.25 | NA | NA | NA | 19.75 | NA | 9.00 | NA | 21.75 | 11.50 |
| | | | 3 | | 6.25 | NA | NA | NA | 16.50 | NA | 11.00 | NA | 14.00 | 8.75 |
| | | | 4 | | 6.50 | NA | NA | NA | 14.25 | NA | 3.75 | NA | 22.50 | 8.50 |
| | | | 5 | | 14.00 | NA | NA | NA | 21.00 | NA | 7.00 | NA | 21.25 | 16.50 |

TABLE 12C-continued

|  |  | MOLASSES | | | | NORLIG A | | | | UREA | |
|---|---|---|---|---|---|---|---|---|---|---|---|
|  |  | 12A | | 12B | | 12C | | 12D | | 12E | |
|  |  | REP A | REP B | REP A | REP B | REP A | REP B | REP A | REP B | REP A | REP B |
|  | 6 | 10.00 | NA | NA | NA | 13.00 | NA | 8.00 | NA | 13.75 | 11.25 |
|  | AVG | 8.21 | NA | NA | NA | 16.54 | NA | 8.04 | NA | 17.54 | 11.21 |
|  | REP | | | | | | | | | | |
| 0.187 | 1 | 7.50 | NA | NA | NA | 18.00 | NA | 5.50 | NA | 17.00 | 12.75 |
|  | 2 | 5.50 | NA | NA | NA | 15.00 | NA | 6.25 | NA | 13.25 | 11.75 |
|  | 3 | 5.25 | NA | NA | NA | 15.75 | NA | 5.50 | NA | 11.00 | 11.75 |
|  | 4 | 5.75 | NA | NA | NA | 13.00 | NA | 8.25 | NA | 14.00 | 11.25 |
|  | 5 | 8.25 | NA | NA | NA | 11.50 | NA | 7.25 | NA | 10.75 | 7.75 |
|  | 6 | 8.50 | NA | NA | NA | 11.25 | NA | 6.00 | NA | 12.25 | 10.50 |
|  | AVG | 6.79 | NA | NA | NA | 14.08 | NA | 6.46 | NA | 13.04 | 10.96 |

Example 13A and 13B—Determine if Adding a Dry Binder, Maltodextrin, to the Base Mix Improves Pelleting and Pellet Quality of a High Urea Pellet A mineral feed supplement was pelleted according to the process and using the equipment as recited in EXAMPLE 12. A base dry mix of ingredients was made according to the following formulations as shown in Table 13A. Samples were dried at 80 degrees Celsius using a bench top fluid bed drier for 15 minutes. Upon seeing the results, samples were further dried at 100 degrees Celsius overnight in a standard forced air drying oven.

TABLE 13A

| Base Mix | % |
|---|---|
| UREA | 23.34% |
| SALT | 9.15% |
| CALCIUM CARB (DUST) | 55.35% |
| POTASSIUM CH 50 | 7.49% |
| MAGNESIUM OXIDE, 56% | 1.06% |
| TRACE MINERALS INCLUDING COPPER, ZINC AND SELENIUM | 3.60% |
|  | 100.00% |

The binder used in EXAMPLES 13A and 13B are shown in TABLE 13B.

TABLE 13B

|  |  | % | % |
|---|---|---|---|
|  | Base Mix | 91.41 | 89.06 |
|  | MaltoDextrin 1909 | 2.34 | 4.69 |
| 50:50 Urea:Water (by wt.) | Added to Simulated Pin Mixer | 6.25 | 6.25 |
|  | Added during Pan Agglomeration | Ad Libitum | Ad Libitum |

The resulting pellets had the following properties as shown in TABLE 13C.

TABLE 13C

|  |  |  |  | 13A | | 13B | |
|---|---|---|---|---|---|---|---|
|  |  |  |  | REP A | REP B | REP A | REP B |
|  |  | Pin Mixer Binder (g) | | 30.00 | 30.00 | 30.00 | 30.00 |
|  |  | Total Binder (g) | | 57.81 | 48.38 | 51.08 | 50.37 |
| Size Distribution | Pellet Diameter (inches) | 0.375 | 9.51 | 6.50 | 2.93 | 18.18 | 35.34 |
|  |  | 0.313 | 8.00 | 12.24 | 4.09 | 15.25 | 12.88 |
|  |  | 0.250 | 6.30 | 25.47 | NA | 28.69 | 23.36 |
|  |  | 0.187 | 4.76 | 44.21 | NA | 51.62 | 37.17 |
|  |  | 0.132 | 3.35 | 83.53 | NA | 87.06 | 74.51 |
|  |  | 0.111 | 2.80 | 35.52 | NA | 37.48 | 32.31 |
|  |  | PAN |  | 73.95 | NA | 83.22 | 52.80 |
| Crush Strength Fluid Bed Dryer Hot Pellet | Pellet Diameter (inches) | 0.25 | 1 | 13.50 | 4.50 | 0.00 | 3.50 |
|  |  |  | 2 | 6.25 | 18.25 | 0.00 | 0.00 |
|  |  |  | 3 | 13.00 | 10.75 | 3.00 | 5.00 |
|  |  |  | 4 | 14.00 | 13.50 | 3.25 | 2.50 |
|  |  |  | 5 | 9.25 | 7.00 | 2.25 | 3.50 |
|  |  |  | 6 | 12.00 | 14.00 | 3.50 | 3.25 |
|  |  |  | AVG | 11.33 | 11.33 | 2.00 | 2.96 |
|  |  | 0.187 | 1 | 18.00 | 5.25 | 3.25 | 6.50 |
|  |  |  | 2 | 8.75 | 17.25 | 0.00 | 0.00 |
|  |  |  | 3 | 8.00 | 9.75 | 5.25 | 4.00 |
|  |  |  | 4 | 13.00 | 9.75 | 2.25 | 4.40 |
|  |  |  | 5 | 7.00 | 9.00 | 0.00 | 4.25 |
|  |  |  | 6 | 12.00 | 10.00 | 2.25 | 0.00 |
|  |  |  | AVG | 11.13 | 10.17 | 2.17 | 3.19 |

TABLE 13C-continued

| | | | | 13A | | 13B | |
| --- | --- | --- | --- | --- | --- | --- | --- |
| | | | | REP A | REP B | REP A | REP B |
| Crush Strength Oven Dried Pellet | Pellet Diameter (inches) | 0.25 | 1 | 18.50 | 25.00 | 21.00 | 53.00 |
| | | | 2 | 26.50 | 19.50 | 38.50 | 19.50 |
| | | | 3 | 25.50 | 20.00 | 33.00 | 36.00 |
| | | | 4 | 33.00 | 16.00 | 28.50 | 32.00 |
| | | | 5 | 24.00 | 18.00 | 38.00 | 49.00 |
| | | | 6 | 30.00 | 17.00 | >60 | 59.00 |
| | | | AVG | 26.25 | 19.25 | 31.80 | 41.42 |
| | | 0.187 | 1 | 16.00 | 18.50 | 36.00 | 42.00 |
| | | | 2 | 26.00 | 22.00 | 48.00 | 25.00 |
| | | | 3 | 11.00 | 20.50 | 33.00 | 25.00 |
| | | | 4 | 16.00 | 16.00 | 16.00 | 22.00 |
| | | | 5 | 18.00 | 19.00 | 44.50 | 37.00 |
| | | | 6 | 23.00 | 21.00 | 27.00 | 26.50 |
| | | | AVG | 18.33 | 19.50 | 34.08 | 29.58 |

Example 14—Nursery Starter Feed

A nursery pig starter feed pellet was made. The following dry mix ingredients and a 50:50 water/molasses binder were provided in the following amounts to a bench top pan agglomerator. Dry mix ingredients were 255 grams and 45 grams of binder. The dry mix and binder tumbled for approximately 2 minutes. The pan of the disc pelletizer was adjusted to an angle of 15-30 degrees as needed relative to horizontal. The pan of the disc pelletizer was rotated at a speed of approximately 15-30 rpms. The resulting pellets were transported to a dryer and dried at temperature of 100 degrees C. for a period of >30 minutes. The resulting pellets were transported to a stack of USA Standard Screens (+5/16 inches (0.313 inches), +¼ inches (0.250 inches), +Number 4 screen (0.187 inches) commercially available from VWR Scientific Corporation of Radnor, Pa., USA. The resulting pellets had the following properties: hardness 3.0-9.5 pounds crush strength, density 28.7-32.5 pounds per cubic foot.

Example 15—Shrimp Feed

A shrimp feed pellet was made. The following dry mix ingredients and a binder comprising 10 g vital wheat gluten and 60 g water were provided in the following amounts to a bench top pan agglomerator Dry mix ingredients used weighed 100 grams. The dry mix and binder tumbled for approximately 2 minutes. The pan of the disc pelletizer was adjusted to an angle of 15-30 degrees as needed relative to horizontal. The pan of the disc pelletizer was rotated at a speed of approximately 15-30 rpms. The resulting pellets were transported to a dryer and dried at temperature of 100 degrees C. for a period of >30 minutes. The resulting pellets were transported to a stack of USA Standard Screens (+5/16 inches (0.313 inches), +¼ inches (0.250 inches), +Number 4 screen (0.187 inches commercially available from VWR Scientific Corporation of Radnor, Pa., USA. The resulting pellets had the following properties: hardness 6.5-12.0 pounds crush strength, density 28.5-39.2 pounds per cubic foot, water stability >24 hours.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the claims use the word "or" in reference to a list of two or more items, that word covers all of the following interpretations of the word: any of the items in the list, all of the items in the list, and any combination of the items in the list. Unless otherwise indicated, all percentages are expressed as percent wet weight basis.

The above detailed descriptions of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, while steps are presented in a given order, alternative embodiments may perform steps in a different order. The various embodiments described herein can also be combined to provide further embodiments.

In general, the terms used in the following claims should not be construed to limit the invention to the specific embodiments disclosed in the specification, unless the above detailed description explicitly defines such terms. While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A method of making feed pellets for an animal, the method comprising:
    feeding binder in a liquid form into a mixing apparatus to combine with a dry mix;
    agglomerating at least two ingredients comprising the binder and the dry mix in the mixing apparatus to form a plurality of nuclei;
    transferring the plurality of nuclei to a growth agglomeration apparatus that is separate from the mixing apparatus; and
    tumbling the plurality of nuclei in the growth agglomeration apparatus and simultaneously feeding an additional amount of the binder in the liquid form and feeding an additional amount of the dry mix to the growth agglomeration apparatus, thereby forming a plurality of feed pellets for an animal;
    wherein the plurality of nuclei and the plurality of feed pellets are formed without pressurized extrusion.

2. The method of claim 1, further comprising drying the plurality of feed pellets.

3. The method of claim 2, further comprising, after drying, sorting the plurality of feed pellets according to a magnitude of a major diameter of each of the feed pellets.

4. The method of claim 1, wherein the feed pellet is a compound feed.

5. The method of claim 1, wherein the feed pellet is a mineral supplement comprising the following ingredients:
- a calcium nutrient provided by a calcium-containing ingredient;
- an added salt nutrient provided by a salt-containing ingredient;
- optionally a non-protein nitrogen nutrient provided by a nitrogen-containing ingredient;
- optionally a trace mineral;
- optionally a vitamin; and
- optionally a binder.

6. The method of claim 1, wherein the feed pellet comprises:
- a nucleus comprising at least two ingredients; and
- an exterior layer comprising the at least two of the ingredients, wherein the exterior layer substantially surrounds the nucleus.

7. The method of claim 6, wherein the feed pellet comprises a pellet of minerals for providing nutrition to an animal, wherein the nucleus comprises a plurality of ingredients comprising:
- a calcium nutrient provided by a calcium-containing ingredient;
- an added salt nutrient provided by a salt-containing ingredient;
- optionally a non-protein nitrogen nutrient provided by a nitrogen-containing ingredient;
- optionally a trace mineral;
- optionally a vitamin; and
- optionally a binder;
- an exterior layer comprising at least the calcium-containing ingredient and the salt-containing ingredient.

8. The method of claim 7, wherein the calcium-containing ingredient is a minus 200 mesh calcium-containing ingredient.

9. The method of claim 7, wherein:
- the calcium nutrient is provided by at least one calcium-containing ingredient, and wherein the calcium-containing ingredient is present in an amount in the range from 50 to 80 percent by weight of the feed pellet; and
- the added salt nutrient is provided by at least one chloride salt-containing ingredient, and wherein the chloride salt-containing ingredient is present in an amount in the range from 15 to 20 percent by weight of the feed pellet.

10. The method of claim 7, wherein the binder comprises a water soluble material.

11. The method of claim 7, wherein the binder comprises molasses and/or animal glue.

12. The method of claim 7, wherein the binder comprises a water insoluble material.

13. The method of claim 12, wherein the water insoluble material comprises vital wheat gluten.

14. The method of claim 6, wherein the exterior layer has a major diameter greater than a major diameter of the nucleus; and wherein the at least two ingredients each comprises a material suitable for fulfilling at least some of the nutritional requirements of the animal.

15. The method of claim 6, wherein the feed pellet comprises a pellet of compound feed for providing nutrition to an animal, wherein the nucleus comprises a first ingredient, a second ingredient, and a binder, wherein the exterior layer comprises the first ingredient, the second ingredient, and the binder, wherein the exterior layer has a major diameter greater than a major diameter of the nucleus, and wherein the first ingredient, the second ingredient, and optionally the binder each comprises a material suitable for fulfilling at least some of the nutritional requirements of the animal.

16. The method of claim 15, wherein the first ingredient, the second ingredient, and the binder each comprises at least one of a protein and a grain.

17. The method of claim 15 wherein the first ingredient comprises at least about 50% protein by weight relative to the total weight of the pellet.

18. The method of claim 17, wherein the protein comprises at least about 50% corn by weight relative to the total weight of the pellet.

19. A system for performing the method of claim 1, the system comprising:
- a source of a first ingredient;
- a source of a second ingredient;
- the mixing apparatus in fluid communication with the source of the first ingredient and the source of the second ingredient to provide the first ingredient and the second ingredient to the mixing apparatus to agglomerate the first ingredient and the second ingredient to form a plurality of nuclei;
- the growth agglomeration apparatus in fluid communication with the mixing apparatus to transfer the plurality of nuclei to the growth agglomeration apparatus to tumble the plurality of nuclei in the growth agglomeration apparatus, wherein the growth agglomeration apparatus is in fluid communication with the source of the first ingredient and the source of the second ingredient to simultaneously provide additional amounts of the first and second ingredients to the growth agglomeration apparatus while tumbling the plurality of nuclei to form the plurality of feed pellets for an animal, wherein the growth agglomeration apparatus is separate from the mixing apparatus wherein the plurality of nuclei and the plurality of feed pellets are formed without pressurized extrusion.

20. The method of claim 1, wherein feeding the binder in the liquid form to the mixing apparatus comprises spraying the binder in the liquid form into the mixing apparatus to contact the dry mix in the mixing apparatus, and wherein feeding the binder in the liquid form to the growth agglomeration apparatus comprises spraying the binder in the liquid form into the growth agglomeration apparatus to contact the dry mix and the nuclei in the growth agglomeration apparatus.

21. The method of claim 1, wherein the additional amount of the dry mix fed to the growth agglomeration apparatus comprises dry mix that has not been fed to the mixing apparatus.

22. The method of claim 1, wherein the plurality of nuclei and the plurality of feed pellets are formed without pressurized briquetting.

23. The method of claim 1, wherein the plurality of nuclei and the plurality of feed pellets are formed without high pressure.

* * * * *